US006473803B1

United States Patent
Stern et al.

(10) Patent No.: US 6,473,803 B1
(45) Date of Patent: *Oct. 29, 2002

(54) VIRTUAL LAN INTERFACE FOR HIGH-SPEED COMMUNICATIONS BETWEEN HETEROGENEOUS COMPUTER SYSTEMS

(75) Inventors: Joel A. Stern, Malvern, PA (US); Robert A. Johnson, Pottstown, PA (US); Dwayne E. Ebersole, Lancaster, PA (US); William W. Disney, Downingtown, PA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/088,552

(22) Filed: Jun. 1, 1998

Related U.S. Application Data

(60) Provisional application No. 60/048,723, filed on Jun. 2, 1997.

(51) Int. Cl.[7] .................. G06F 15/173; H04L 12/28
(52) U.S. Cl. .................. 709/238; 370/401
(58) Field of Search ............... 709/250, 230, 709/237, 238, 239, 248, 249, 252, 203, 204, 205, 208, 212, 220; 710/36, 38, 128, 131; 370/401, 402, 403, 404, 405, 406, 407, 408

(56) References Cited

U.S. PATENT DOCUMENTS

| | | | | |
|---|---|---|---|---|
| 3,400,372 A | | 9/1968 | Beausoleil et al. | 340/172.5 |
| 4,155,117 A | | 5/1979 | Mitchell et al. | 364/200 |
| 4,414,620 A | | 11/1983 | Tsuchimoto et al. | 364/200 |
| 4,516,199 A | * | 5/1985 | Frieder et al. | 364/200 |
| 5,093,780 A | | 3/1992 | Sunahara | 395/800 |

(List continued on next page.)

FOREIGN PATENT DOCUMENTS

| | | | | |
|---|---|---|---|---|
| WO | WO 95/01023 | * | 1/1995 | H04L/12/18 |
| WO | WO 97/01944 | | 1/1997 | |
| WO | WO 98/56150 | | 12/1998 | |

OTHER PUBLICATIONS

Cisco, Cisco IOS Software Release 11.1 new features, http://www.cisco.com/warp/public/x..mkt/ios/rel/111/prodlit/402_pp.htm, 23 pages, Feb. 1996.*

(List continued on next page.)

*Primary Examiner*—Robert B. Harrell
*Assistant Examiner*—Bunjob Jaroenchonwanit
(74) *Attorney, Agent, or Firm*—Steven B. Samuels; Michael B. Atlass; Mark T. Starr

(57) ABSTRACT

Methods and apparatus that enable a first network protocol provider, executing on a first computer system, and a second network protocol provider, executing on a second computer system which is directly interconnected to the first computer system, to communicate at high speed, with low latency, over the interconnection therebetween such that both systems may use their native mechanisms to communicate with each other without change in those mechanisms, rather than over conventional network communication paths such as Ethernet. An interconnection couples the input/output (I/O) subsystem of the first computer system to the I/O subsystem of the second computer system such data can be transmitted between the systems, and a virtual LAN ("VLAN") device driver executing on the second computer system provides an interface between the interconnection and the native communications mechanisms of the second computer system. The VLAN simulates a conventional network driver such as an NDIS Fiber Distributed Data Interface (FDDI) network interface card (NIC) Miniport driver to the transport protocol driver TCPIP.SYS on the second computer system and exchanges data with the first computer system via a particular line of a LAN station group for delivery to and receipt from the first computer system.

14 Claims, 15 Drawing Sheets

U.S. PATENT DOCUMENTS

| | | | | |
|---|---|---|---|---|
| 5,117,486 A | | 5/1992 | Clark et al. ................. | 395/250 |
| 5,247,616 A | | 9/1993 | Berggren et al. ........... | 395/200 |
| 5,321,817 A | | 6/1994 | Feinstein .................... | 395/325 |
| 5,371,852 A | * | 12/1994 | Attansio et al. ............ | 395/200 |
| 5,379,296 A | | 1/1995 | Johnson et al. ............... | 370/60 |
| 5,381,534 A | | 1/1995 | Shi ........................... | 395/200 |
| 5,459,836 A | | 10/1995 | Whittaker et al. ..... | 395/200.07 |
| 5,528,765 A | * | 6/1996 | Milligan ..................... | 710/107 |
| 5,561,806 A | | 10/1996 | Fitchett et al. .............. | 395/800 |
| 5,581,709 A | | 12/1996 | Ito et al. ................ | 395/200.15 |
| 5,581,741 A | | 12/1996 | Clark et al. .................. | 395/500 |
| 5,612,953 A | | 3/1997 | Olnowich ................... | 370/367 |
| 5,630,061 A | * | 5/1997 | Richter et al. ......... | 395/200.02 |
| 5,634,015 A | | 5/1997 | Chang et al. ............... | 395/309 |
| 5,640,541 A | * | 6/1997 | Bartram et al. ............. | 395/500 |
| 5,648,965 A | | 7/1997 | Thadani et al. ............. | 370/241 |
| 5,655,140 A | | 8/1997 | Haddock .................... | 395/200 |
| 5,669,002 A | | 9/1997 | Buch .......................... | 395/726 |
| 5,701,423 A | | 12/1997 | Crozier ...................... | 395/335 |
| 5,754,799 A | * | 5/1998 | Hiles .......................... | 710/110 |
| 5,774,665 A | * | 6/1998 | Jeong et al. ................. | 709/218 |
| 5,790,548 A | * | 8/1998 | Sistanizadeh et al. ....... | 370/401 |
| 5,815,668 A | * | 9/1998 | Hashimoto .................. | 709/238 |
| 5,841,990 A | * | 11/1998 | Picazo, Jr. et al. .......... | 709/249 |
| 5,867,648 A | * | 2/1999 | Foth et al. ................... | 709/230 |
| 5,909,546 A | * | 6/1999 | Osborne ..................... | 709/212 |
| 5,911,776 A | * | 6/1999 | Guck .......................... | 709/217 |
| 5,912,891 A | * | 6/1999 | Kanai .......................... | 370/395 |
| 5,913,028 A | * | 6/1999 | Wang et al. ................. | 709/203 |
| 5,923,654 A | * | 7/1999 | Schnell ....................... | 370/390 |
| 5,925,097 A | * | 7/1999 | Gopinath et al. ........... | 709/200 |
| 5,958,018 A | * | 9/1999 | Eng et al. .................... | 709/246 |
| 5,968,126 A | * | 10/1999 | Ekstrom et al. ............ | 709/225 |
| 5,991,817 A | * | 11/1999 | Rowett et al. .............. | 709/250 |
| 6,003,105 A | * | 12/1999 | Vicard et al. ............... | 710/129 |

OTHER PUBLICATIONS

Polaris Press Release "Polaris Communications and Microsoft Team Up to Provide system 2000 gateway for Microsoft SNA server", 3 p., Jun. 1995.*

Comer, Internetworking with TCP/IP 3rd. ed., 2p., 1995.*

Polaris White POaper "TCP/IP to SNA Connectivity with channel–Attach Gateways", 25 p., 1996.*

Polaris : thge fundamentals of MAinframe Channels for Network Professionals, 15 pg., 1996.*

Olaf, The Linux Network Administrators' Guide, 91 pg, 1994.*

Virtual Lan Flexible network segmentation for high–speed LANs, Intel, www.intel.com, pp. 1–8 (8), 1997.*

ATM LAN emulation, Klessig, www.3com.com, pp. 1–15 (15), Sep. 1997.*

Model 2100A Installation manual, Polaris, Polaris communications Inc., pp. 1–22 (27), Jan. 1995.*

Bus–Tech teams with IBM to offer TN3270E Solution, Bus–Tech Press release, p. 2, Jul. 1997.*

Bus–Tech Integrates Microsoft's SNA Server Version 4.0 into NetShuttle 220, Intrnet–to–Mainframe Product, Bus–Tech Press release, p. 2, Feb. 1998.*

3COM and Bus–Tech Partner to Deliver Mainframe SNA to IP solutions, Bus–Tech Press release, p. 3, Dec. 1997.*

Chun et al., "Virtual Network Transport Protocols For Myrinet," *IEEE Micro*, (Jan./Feb. 1998), 53–63.

ClearPath HMP NX Series with Windows NT Network Services Implementation Guide (Part No. 4198 6670)(Feb. 1997).

ClearPath HMP NX and A Series BNA/CNS Network Implementation Guide, vol. 2: Configuration (Part No. 3789 7014) (Jun. 1996).

ClearPath HMP NX Series with Windows NT Implementations and Operations Guide (Part No. 8807 6542)(Feb. 1997).

ClearPath HMP NX Series with Windows NT Migration Guide (Part No. 8807 7730) (Feb. 1997).

ClearPath HMP NX and A Series Networking Capabilities Overview (Part No. 3789 7139)(Jun. 1996).

ClearPath HMP NX and A Series Networking Operations Reference Manual, vol. 1: Commands and Inquiries (A through N)(Part No. 3787 7917)(Jun. 1996).

ClearPath HMP NX and A Series Networking Operations Reference Manual, vol. 2: Commands and Inquiries (O through Z)(Part No. 3787 7917)(Jun. 1996).

ClearPath HMP NX and A Series Networking Products Installation Guide (Part No. 4198 4840)(Jun. 1996).

* cited by examiner

QSP:

ICD:

QSP:

VIRTUAL LAN INTERFACE FOR HIGH-SPEED COMMUNICATIONS BETWEEN HETEROGENEOUS COMPUTER SYSTEMS

CROSS-REFERENCE TO RELATED APPLICATIONS

This is a regular U.S. patent application based on provisional application serial No. 60/048,723, filed Jun. 2, 1997, entitled "Apparatus and Method for a Cooperative Networking Platform," the entire contents of which are hereby incorporated by reference. A claim for priority has been made under 35 U.S.C. §119(e).

This application is related to co-pending application Ser. No., filed Jun. 1, 1998, entitled Shared Use Of A Network Interface Card Between Heterogeneous Computer Systems, which is also hereby incorporated by reference in its entirety.

COPYRIGHT NOTICE

A portion of the disclosure of this patent document contains material that is subject to copyright protection. The copyright owner has no objection to the facsimile reproduction by anyone of the patent document or the patent disclosure as it appears in the United States Patent & Trademark Office patent file or records, but otherwise reserves all copyright rights whatsoever.

BACKGROUND

1. Field of the Invention

The present invention relates to the field of computer networking, and, more particularly, to apparatus and methods for allowing two heterogeneous computer systems to communicate with each other via an interconnection including a simulated or "virtual" LAN interface.

2. Description of the Prior Art

The ability for heterogeneous computer systems to communicate with each other over a network using standard and/or proprietary networking protocols is known. Most computer systems have some form of networking architecture that enables the computer system to perform networking in accordance with those protocols. Such a networking architecture typically comprises both system software and hardware. FIG. 1 is a block diagram illustrating the components of a networking architecture employed by a Unisys A Series enterprise server 10 in order to communicate with other hosts, or nodes, on a network 15.

The A Series enterprise server 10 executes the Unisys MCP operating system 12, and has an I/O subsystem that comprises one or more I/O Modules (IOM) 14 housed within the A Series chassis. The IOM 14 implements a Unisys proprietary I/O bus architecture referred to as CS-BUS II or CS-Bus III (hereinafter "the CS Bus"). A plurality of card slots, e.g. slots 16a–d, are provided for connecting interface cards, referred to as "channel adapters", into the CS Bus. Different groups, or racks, of channel adapter slots are each controlled by a Channel Manager Unit (CMU) (e.g., CMUs 18a, 18b). An IOM can contain several CMUs, each of which controls a different rack of channel adapter card slots via the CS-Bus. The CMUs manage the physical and data layers of the I/O process.

Channel adapter cards, which each may occupy one or more channel adapter card slots within the IOM 14, provide various connectivity solutions for the A Series enterprise server 10. For example, Unisys provides a channel adapter card that implements the Small Computer System Interface (SCSI) protocol for connecting SCSI peripherals to the enterprise server 10.

For network connectivity, Unisys provides several channel adapters to support various physical networking protocols. These channel adapters are generally referred to as network processors (NP). For example, Unisys ICP22 and ICP26 network processors are channel adapter cards that implement the Ethernet network protocol and can be used to connect an A Series enterprise server 10 to an Ethernet network. Unisys also provides network processors for connectivity to FDDI and ATM networks. As shown in FIG. 1, a number of different network processors (e.g., NPs 20a, 20b, and 20c) can be installed in respective channel adapter slots (e.g., slots 16b, 16c, and 16d) of the IOM 14, in order to provide different network connectivity solutions.

As shown in the more detailed view of network processor 20c (installed in channel adapter slot 16d), a network processor may comprise a plurality of different lines, e.g., Line0, Line1 . . . LineN. A line represents a physical endpoint within a network. For example, the Unisys ICP22 network processor has two lines, each of which comprises a separate Ethernet connection—one line could be connected to one Ethernet network, and the other to a different Ethernet network.

Each line of a network processor can have one station group defined on that line. A station group consists of one or more stations. A station is a logical endpoint that represents a logical dialog on that line. Thus, more than one logical dialog can take place over a given line of a network processor. This is achieved through multiplexing. For example, with a connection-oriented networking protocol, such as the Burroughs Network Architecture—Version 2 protocol (BNAv2), one station may represent a logical dialog with one other BNAv2 host on the network, whereas another station may represent a logical dialog to a different BNAv2 host. As illustrated in FIG. 1, for example, Station0 of LineN may represent a logical dialog with BNAv2 host 22, and Station1 of LineN may represent a logical dialog with BNAv2 host 24. For networking protocols that are not connection-oriented, like the Internet Protocol (IP), only one station needs to be defined to handle all communications for that protocol stack. For example, in FIG. 1, StationN of LineN could be defined as the logical endpoint for all IP traffic over LineN. A Local Area Network Station Group (LANSG) module 26, which comprises software executing on the network processor 20c, provides callable procedures for creating and maintaining stations and station groups on the various lines of the network processor 20d and for sending and receiving data over them.

Other software components that execute on the network processor 20c include a Queue Service Provider (QSP) module 28, which handles the multiplexing and demultiplexing of data for all stations defined on a given NP, and two stub modules—a Network Services Manager stub (NSM-stub) 30 and a Link Layer Manager stub (LLM-stub) 32—which interface with corresponding modules of a Core Network Services (CNS) software component 34, to and from modules within the MCP environment.

Generally, a network processor (e.g., NP 20a, 20b, or 20c) implements the data link and physical layers of the 7-layer ISO Reference Model. Higher level networking protocols that a client application 46 may wish to employ in order to communicate with applications running on different hosts of the network 15, such as the BNAv2 and TCP/IP networking protocols, are implemented as network protocol providers on the A Series system 10. A network protocol provider is a software module that implements these higher level networking protocols. For example, Unisys provides both BNAv2 Host Resident Network Provider (HRNP) modules and TCP/IP HRNP modules. In the example of FIG. 1, a BNAv2 HRNP 42 and a TCP/IP HRNP 44 are shown.

The Core Network Services (CNS) software 34 provides support for the network protocol providers 42, 44 and handles the initialization and maintenance of network processors and the station groups defined thereon. Specifically, CNS 34 comprises a Network Services Manager (NSM) 36 that initializes and manages the network processors (e.g., 20a, 20b, 20c) installed in the system, and a Link Layer Manager (LLM) 38 that initializes and maintains the identity and attributes of each station group defined on a given network processor. Another component (not shown) of CNS 34 validates attributes associated with station groups and stations created on a network processor. These attributes are passed between the network processor and CNS 34 via a control dialog when the stations are defined. Like the stub procedures for the NSM and LLM modules 36, 38, network processors also have a stub procedure (LLAH, not shown) that corresponds to the attribute handler of CNS 34. An NPSUPPORT software library 40, as well as portions of the MCP operating system 12, provide routines and procedure calls that serve as an interface between a network processor and the CNS 34 and network protocol providers 42, 44, and control loading of software to the NPs and dumping of their state.

Each network processor has an associated identifier that uniquely identifies that network processor within the system 10. When a network processor is initialized and brought on-line, the NSM-stub 30 in the network processor interfaces with the NSM 36 of CNS 34 via a control dialog in order to pass its identifier to the NSM 36. The NSM 36 manages the identifiers of all active network processors.

Each station group and station defined for a given network processor also has a unique identifier associated with it. Via a control dialog established between the LLM-stub 32 on the network processor and the LLM 38 of CNS 34, the station and station group identifiers are passed to the LLM 38 during initialization. Within the LLM 38, a station corresponds to a connection, and a station group corresponds to a connection group.

As mentioned above, the ability to define multiple stations (i.e., a station group) on a single physical line of a network processor is achieved through multiplexing. Specifically, the QSP 28 in the network processor multiplexes inbound and outbound data for multiple stations on a given line. Moreover, the QSP is responsible for distributing request and response data between the NSM 36 and NSM-stub 30 and between the LLM 38 and LLM-stub 32. To that end, each entity on the network processor that receives outbound data from the MCP, including every station, the NSM-stub 30, and the LLM-stub 32, is assigned a unique Remote Queue Reference (RQR) by the QSP. The NSM-stub RQR is reported to the NSM 36 within CNS 34 via NPSUPPORT 40 when the NP is loaded. The LLM-stub RQR is reported to the LLM 38 via the NSM 36 by the NSM-stub 30 when the NP initializes. All of the station RQRs are reported to the HRNPs 42, 44 as the stations open.

When a client application is required to send data via network 15 to some other host or node on the network 15, such as another BNAv2 Host 22, 24 or another TCP/IP host 25, it invokes the services of the appropriate network protocol provider, e.g., 42, 44. The network protocol provider 42, 44 determines the appropriate network processor and station on which the data is to be output, adds protocol headers, and makes a corresponding request to the MCP 12 that includes the identifier of the network processor and the RQR of the station. The data and associated RQR are passed from the MCP 12 to the QSP 28 on the network processor (e.g., network processor 20c), which, in combination with the LANSG module 26, sends the data out to the network 15 via the appropriate line (e.g., Line0, Line1, ... or LineN) as part of the logical dialog represented by the designated station.

When data is received from the network 15 on a given line, the LANSG module 26 determines, from header information associated with the data, the station (i.e. logical dialog) for which the data is intended. The LANSG and QSP modules 26, 28, in combination with portions of the MCP 12 and NPSUPPORT library 40, pass the received data to the appropriate network protocol provider 42, 44 associated with that station, along with an indication of which station received the data. For example, one of the stations on LineN of the network processor 20c of FIG. 1 (e.g., station0) may be defined as the logical endpoint for the BNAv2 HRNP 42, while a different station (e.g., station1) may be defined as the logical endpoint on which all IP traffic over LineN is received for the TCP/IP HRNP 44. When a frame of data is received from the network on LineN, the LANSG module 26 determines from header information which of the network protocol providers (i.e., stations) is intended to receive the data. This determination is performed in accordance with the methods described in commonly assigned, U.S. Pat. No. 5,379,296, entitled "Method and Apparatus for Interfacing a Workstation to a Plurality of Computer Platforms" (Johnson et al.).

In addition to its use in A Series computers, the foregoing networking architecture is also employed in Unisys ClearPath HMP NX enterprise servers. A ClearPath HMP NX server comprises an A Series enterprise server tightly integrated with a server running Microsoft Window NT. Please note that "Microsoft," "Windows," and "Windows NT" are registered trademarks of Microsoft Corporation. Additional information concerning the foregoing networking architecture can be found in the following documents, each of which is available from Unisys Corporation, assignee of the present invention, and each of which is hereby incorporated by reference in its entirety:

ClearPath HMP NX Series with Windows NT Network Services Implementation Guide (Part No. 4198 6670);
BNA/CNS Network Implementation Guide, Volume 2: Configuration (Part No. 3789 7014);
ClearPath HMP NX Series with Windows NT Implementations and Operations Guide (Part No. 8807 6542);
ClearPath HMP NX Series with Windows NT Migration Guide (Part No. 8807 7730);
Networking Capabilities Overview (Part No. 3789 7139)
Networking Operations Reference Manual, Volumes 1 and 2: Commands and Inquiries (Part No. 3787 7917); and
Networking Products Installation Guide (Part No. 4198 4840).

Using a Unisys ICP22 network processor, which is an Ethernet-based channel adapter, it has been possible in the past for a Unisys A Series enterprise server to communicate with a workstation or personal computer (PC) over a network. An example of this ability is illustrated in FIG. 2. In this example, the A Series enterprise server 10 communicates with an Intel-based workstation 48 running the Microsoft Windows NT operating system (hereinafter "the NT server"). The A Series enterprise server 10 is connected to the network via network processor 20a, which may, for example, be a Unisys ICP22 Ethernet-based network processor.

The I/O subsystem of the NT server 48 comprises portions of the NT operating system kernel, an EISA or PCI bus 52, and appropriate device driver software. To provide network connectivity, a network interface card (NIC) 50 is installed in an available bus slot on the NT server 48. The NT server may support one or both of the PCI and EISA bus standards. NICs are available for both bus standards.

A NIC device driver 54 that typically is sold with the NIC card 50 is installed in the kernel space of the NT operating system. The NIC device driver 54 interfaces with a higher level network protocol provider, such as an implementation of the TCP/IP protocol. Microsoft Corporation provides an implementation of the TCP/IP protocol in the form of a kernel level device driver, also referred to as a transport protocol driver, named TCPIP.SYS 58. TCPIP.SYS 58 interfaces with the NIC device driver 54 via NDIS, an industry standard Network Driver Interface Specification jointly developed by Microsoft and 3Com. NDIS 56 defines an interface for communication between hardware-independent protocol drivers, such as TCPIP.SYS 58, which implement the Data Link, Network, and Transport layers of the OSI model, and hardware-dependent NIC drivers 54 which provide an interface to the NIC hardware and which correspond to the Physical Layer of the OSI model. A client program 60 on the NT server can communicate over the network 15 in accordance with the TCP/IP protocol by issuing suitable calls via the NT operating system to the TCPIP.SYS protocol driver 58.

Network interface cards and associated device drivers for NT servers are available from a number of Original Equipment Manufactures (OEMs). OEM NICs are available at relatively low cost for a variety of different network media standards, including Ethernet, Fast-Ethernet, etc. As new network standards evolve, OEMs are quick to design and produce NICs to support these standards. Because these NICs are developed for industry standard I/O bus architectures, such as EISA and PCI, which are found in the many computer systems today, the economies of scale result in fast cycle development times and extremely low prices for consumers.

On the contrary, it takes significantly longer and costs significantly more to design and produce a new network processor for a proprietary bus architecture, such as the CS-BUS II architecture of Unisys A Series enterprise servers. Vendors of proprietary systems cannot achieve the same economies of scale as the open system NIC vendors, and network processors, or NIC cards, for proprietary systems therefore typically cost significantly more than their open systems counterparts. To avoid the costs associated with the development of NIC cards for proprietary systems such as the A series enterprise server, it has been proposed in the afore-mentioned co-pending application to provide a direct interconnection between an A series enterprise server and an NT server so that both systems may connect to a network via a shared network interface card installed on the NT server. It is further desired to provide a high speed, low latency communications path between the interconnected A series enterprise server and the NT server such that both systems may use their native mechanisms to communicate with each other rather than conventional network communications paths such as Ethernet, which may be considerably slower. The present invention provides such a capability.

SUMMARY OF THE INVENTION

The present invention is directed to methods and apparatus that enable a first network protocol provider, executing on a first computer system, and a second network protocol provider, executing on a second computer system which is directly interconnected to the first computer system, to communicate at high speed, with low latency, over the interconnection therebetween such that both systems may use their native mechanisms to communicate with each other without affecting their native protocols, rather than over conventional network communication paths such as Ethernet. In accordance with a preferred embodiment thereof, the present invention comprises an interconnection that couples the input/output (I/O) subsystem of the first computer system to the I/O subsystem of the second computer system and over which data can be transmitted between the systems independent of a network interface card, and a virtual LAN ("VLAN") device driver executing on the second computer system as an interface between the interconnection and the native communications mechanisms of the second computer system. In a preferred embodiment, the VLAN simulates an NDIS Fiber Distributed Data Interface (FDDI) network interface card (NIC) Miniport driver to the transport protocol driver TCPIP.SYS on the second computer system and exchanges data with the first computer system via a particular line of a LAN station group for delivery to and receipt from the first computer system. In other words, VLAN appears to be an FDDI NIC to TCPIP.SYS and to the LAN station group in the interconnect path. However, in reality, VLAN is just an NDIS device driver that simulates an FDDI interface card to the Windows NT NDIS Wrapper. Thus, when outgoing data from one of the first and second network protocol providers is addressed to the other network protocol provider, the data is communicated directly from one network protocol provider to the other via the VLAN interface and the interconnection. Preferably, VLAN provides the same external interfaces as any other NDIS driver. VLAN conforms to the standards set for NDIS Miniport Drivers in order to remain transparent to the higher layer protocols. On the other hand, VLAN has a procedural interface to the LAN station group module which is not bound by strictly enforced interface definitions. The interface to the LAN station group is based upon a modified set of the rules that are enforced by the NDIS Wrapper.

The interconnection between the I/O subsystem of the first computer system and the I/O subsystem of the second computer system preferably comprises a physical connection between the I/O subsystems over which data can be transmitted between them, and an interconnection device driver on the second computer system that controls access by the second computer system to the physical connection. The interface between the interconnection device driver and other components on the second computer system is preferably implemented in the form of a procedure registration mechanism. In this manner, different interconnection device drivers can be installed on the second computer system for different physical connections, in a manner that is transparent to the other components of the invention. For example, when the first and second computer systems are separate physical units, the physical connection may comprise suitable hardware (e.g., interface boards) installed in available slots of the I/O buses of each system and a cable that provide a connection between them. Alternatively, where the first computer system is emulated within the second system, the physical connection may be emulated within the second system in the form of a memory-to-memory connection.

While VLAN emulates an FDDI-like LAN, it is really point-to-point within the memory of the second computer system. Because a standard LAN such as FDDI is emulated, the communications protocol, for example, TCP/IP on both servers, can work unmodified. Likewise, all programs that use TCP port files on one computer system and WinSock TCP sockets on the other computer system can intercommunicate without changes. Because the VLAN connection is actually the memory of the second computer system, the latency of a message through the interconnection is small, and VLAN can sustain a higher transaction rate than other channel adapters. Also, emulating an FDDI LAN allows the use of segment sized larger than can be supported over Ethernet (4500 bytes versus 1500 bytes for Ethernet). Because the overhead of each segment is spread out over larger segments, the overall data throughput is correspondingly higher and is comparable to the throughput of FDDI for similarly sized messages, thereby substantially improving the communications speed and latency for data transmissions between the interconnected computer systems.

Additional features and advantages of the present invention will become evident hereinafter.

BRIEF DESCRIPTION OF THE DRAWINGS

The foregoing summary, as well as the following detailed description of the preferred embodiment, is better understood when read in conjunction with the appended drawings. For the purpose of illustrating the invention, there is shown in the drawings an embodiment that is presently preferred, it being understood, however, that the invention is not limited to the specific methods and instrumentalities disclosed. In the drawings.

DETAILED DESCRIPTION OF THE PREFERRED EMBODIMENT

As will be described below with respect to FIGS. 3–10, the present invention is directed to methods and apparatus that enable a first network protocol provider, executing on a first computer system, and a second network protocol provider, executing on a second computer system, which is directly interconnected to the first computer system, to communicate at high speed, with low latency, over the interconnection therebetween such that both systems may use their native mechanisms to communicate with each other rather than conventional network communication paths such as Ethernet. In accordance with a preferred embodiment thereof, the present invention comprises an interconnection that couples the input/output (I/O) subsystem of the first computer system to the I/O subsystem of the second computer system and over which data can be transmitted between systems, and a virtual LAN ("VLAN") device driver executing on the second computer system as an interface between the interconnection and the native communications mechanisms of the second computer system.

In one embodiment, described more fully hereinafter, the methods and apparatus of the present invention may be implemented as part of a Cooperative Networking Platform (CNP) (sometimes also referred to "NX/Network Services" or "NNS") provided as a feature of Unisys ClearPath HMP NX enterprise servers, in which, as mentioned above, a Unisys A Series enterprise server is tightly integrated with an Intel-based server running Microsoft Windows NT. In that embodiment, the A Series enterprise server comprises the first computer system and the NT server comprises the second computer system. As embodied in that environment, the present invention allows a network protocol provider (e.g., TCP/IP HRNP) on the A Series server to communicate with the NT server in the native mechanisms of each network protocol provider at high speed with low latency.

The methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Figure 3:
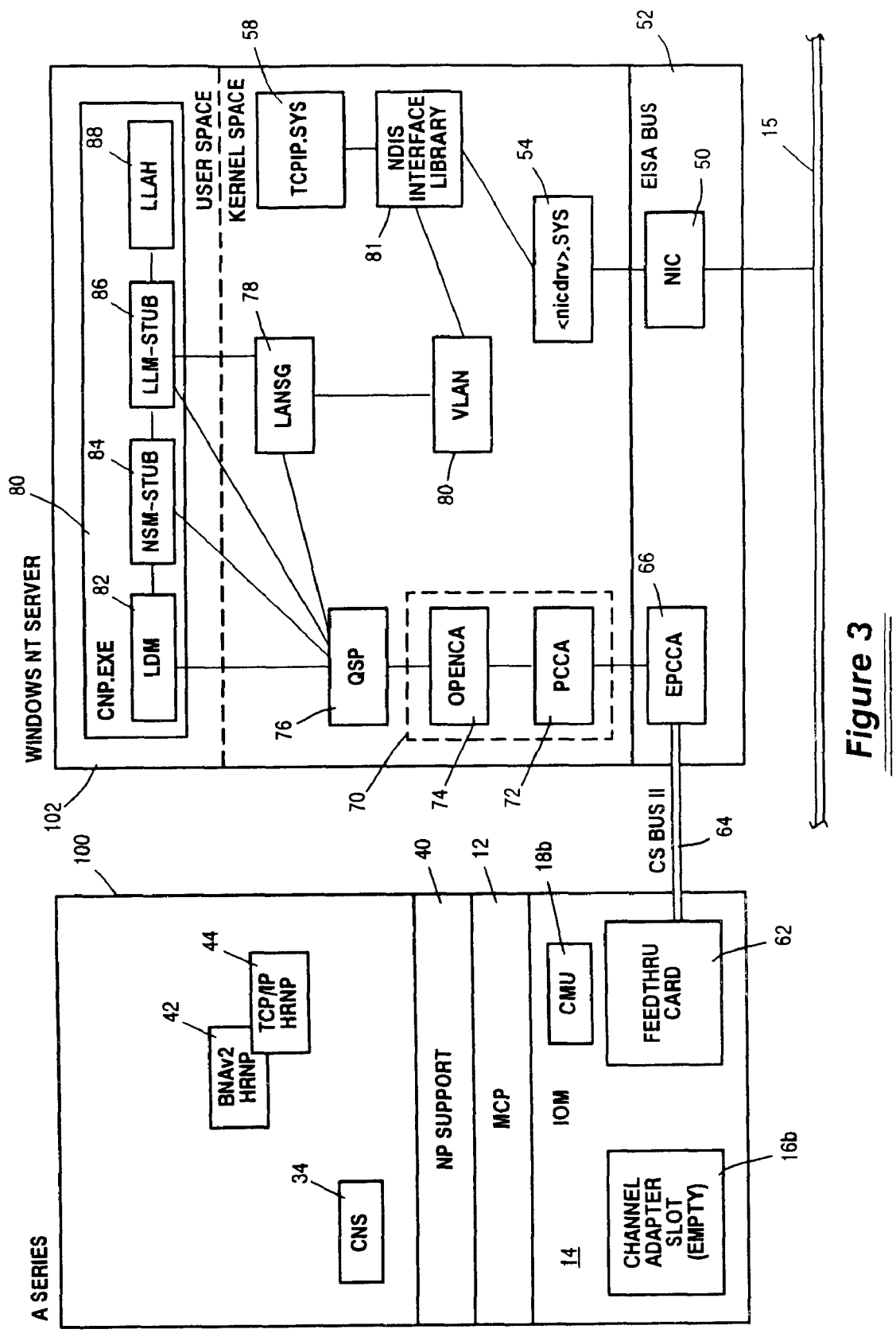
FIG. 3 is a block diagram illustrating one embodiment of apparatus that enables two computer systems to communicate via a virtual LAN in accordance with the present invention.

In the drawings, where like numerals represent like elements throughout, FIG. 3 is a block diagram illustrating one embodiment of the present invention, in which the methods and apparatus of the present invention are implemented as part of a Cooperative Networking Platform (CNP) deployed on a Unisys ClearPath HMP NX computer system ("the ClearPath system"). As shown, the ClearPath system comprises a Unisys A Series enterprise server 100 and an Intel-based server 102 running Windows NT 102 ("the NT server"). In this embodiment, the A Series enterprise server 100 defines a first computer system and the NT server 102 defines a second computer system. A first network protocol provider 44 is provided on the A Series system 100, in this case a TCP/IP HRNP, and it has a network address (i.e., IP address) associated with it. A second network protocol provider 58 is provided on the NT server 102, in this case TCPIP.SYS (available from Microsoft Corporation), and it has its own network address (i.e., IP address) associated with it that defines a second network address in this embodiment. Other network protocol providers may be installed on the A Series and NT servers as well. For example, on the A Series server, a BNAv2 HRNP 42 may be provided. Note, however, that because the BNAv2 protocol is a Unisys proprietary protocol, the BNAv2 HRNP 42 does not have an IP address associated with it. A network interface card (NIC) 50 is installed in a slot of the I/O bus (e.g., EISA or PCI) of the NT server 102. Any LAN-type NIC that is compatible with Windows NT can be employed. Preferably, the NIC supports the Fast-Ethernet networking protocol (e.g., 100Base-T). NICs of this type are available from numerous vendors and original equipment manufacturers (OEMs). NICs supporting other physical media types, such as Ethernet/802.3, FDDI, or Gigabit Ethernet, can alternatively be employed. Typically, a NIC vendor will supply a device driver with the NIC, which is installed in the kernel space of the operating system so that other entities on the system can access the networking functionality of the NIC. The NIC 50 of the exemplary system of FIG. 3 has a device driver 54 ("<nicdrv>.sys") that is installed in the Windows NT kernel space, as shown.

Apparatus of the present invention comprises an interconnection that couples the I/O subsystem of the A Series server 100 to the I/O subsystem of the NT server 102 so that data can be transmitted between the two servers, and a "virtual" LAN ("VLAN") that executes on the second computer system (i.e., the NT server 102). Additional details of the interconnection and of the VLAN are provided hereinafter. Those skilled in the art will appreciate that the following detailed description is for illustrative purposes only and is not intended to limit the scope of the invention. Rather, the scope of the invention can be determined from the appended claims.

I. THE INTERCONNECTION

As mentioned above, the interconnection of the apparatus of the present invention couples the I/O subsystem of the A Series server 100 to the I/O subsystem of the NT server 102 to provide a relatively high speed data path between systems. Preferably, the interconnection comprises a physical connection between the I/O subsystems of the first and second computers, and an interconnection device driver 70 that controls access to the physical connection by other software modules on the NT server 102.

A. First Embodiment

In the embodiment of FIG. 3, the physical connection comprises a feedthrough card 62 installed in a channel adapter slot of the A Series server 100, an EISA Personal Computer Channel Adapter (EPCCA) card 66 installed in an EISA slot of the I/O bus of the NT server 102, and a CS-BUS II cable that connects the CS-BUS II of the A Series server 100 to the EPCCA card 66 via the feedthrough card 62. The interconnection device driver (ICD) 70 is installed in the kernel space of the NT operating system. It controls access to the physical connection (specifically the EPCCA card 66) by other modules on the NT server.

Figure 1:
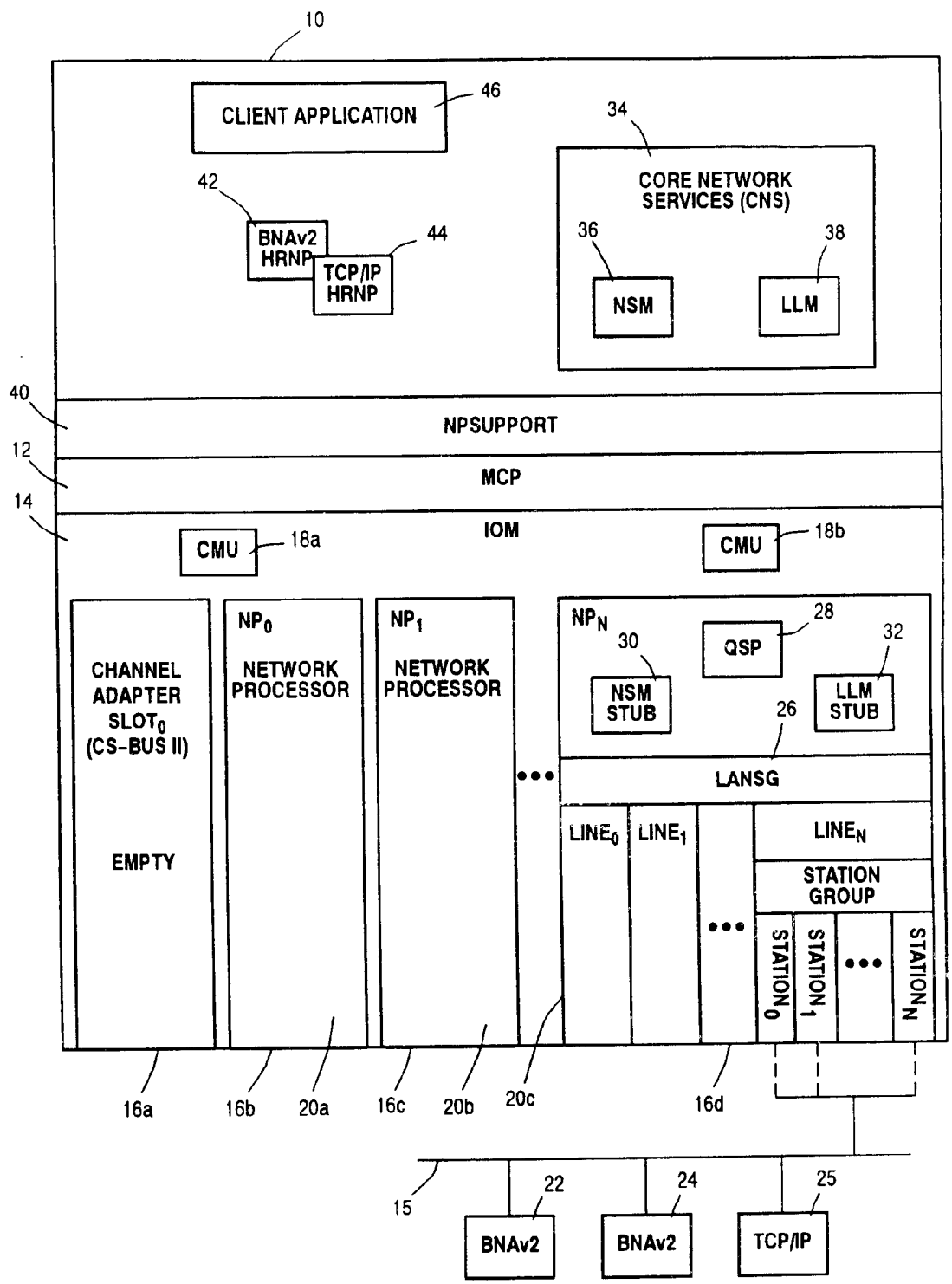
FIG. 1 is a block diagram illustrating the components of a prior art networking architecture employed by Unisys A Series enterprise servers in order to communicate with other hosts, or nodes, on a network.
Figure 2:
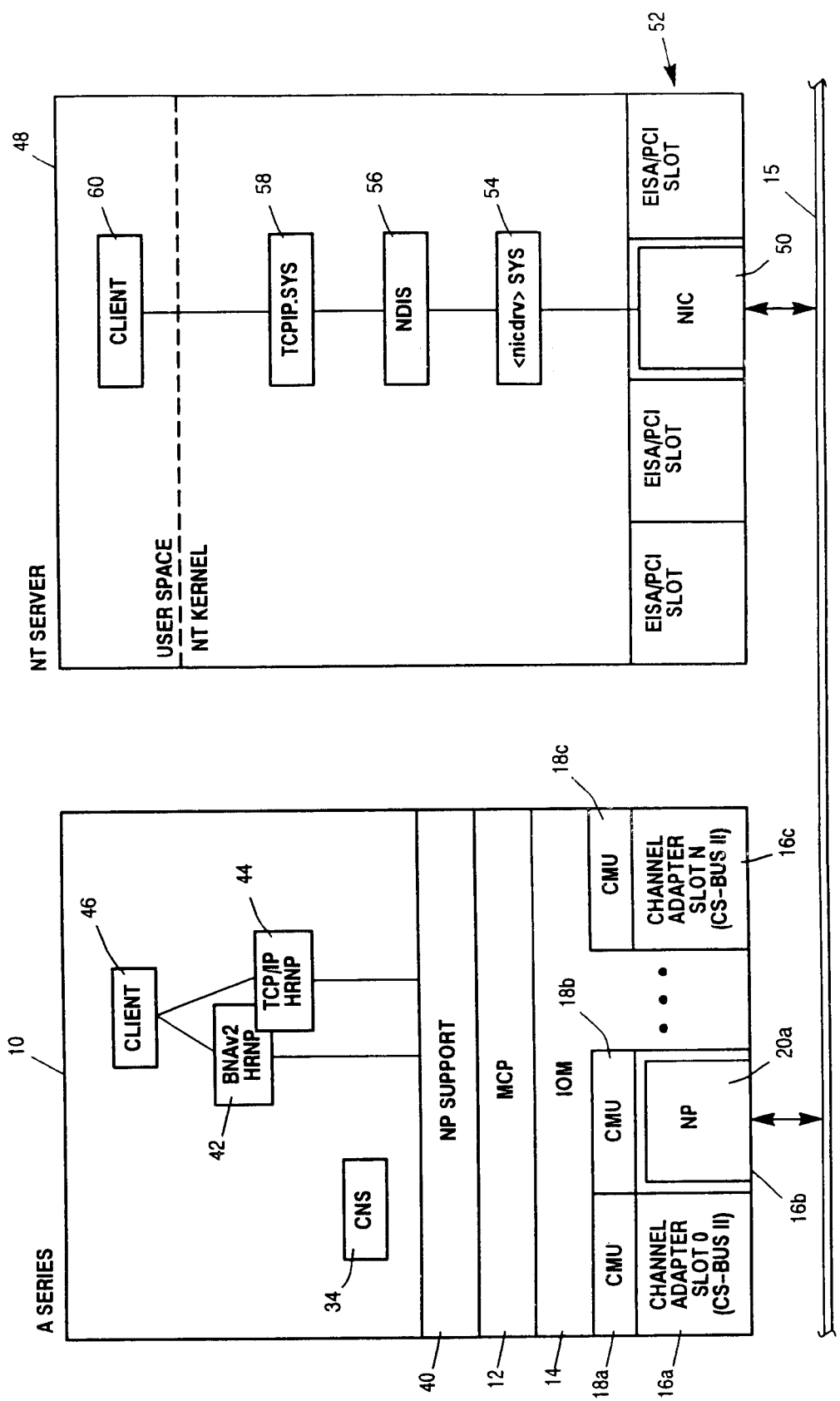
FIG. 2 is a block diagram showing a prior art method by which a Unisys A Series enterprise server can communicate via a network with a server running Microsoft Windows NT.

Although not necessary in every embodiment of the present invention, in the embodiment illustrated in FIG. 3, the interconnection further comprises several modules that are analogous to similarly named components in the traditional Unisys networking architecture illustrated in FIG. 1 and described in the background section of this specification. These modules include a Queue Service Provider module 76 that functions analogously to the QSP 28 of FIG. 1, a LANSG module 78 that functions analogously to the LANSG module 26 of FIG. 1, and NSM-stub and LLM stub modules 84, 86 that function analogously to the corresponding components 30, 32 of FIG. 1. In addition, LDM and LLAH modules 82, 88 are provided which function analogously to the similarly named components (not shown in FIG. 1) in a traditional Unisys networking architecture. Also, in accordance with the invention a "virtual" LAN device driver 80 and an NDIS Miniport Interface Library 81 together with LANSG and the remainder of the interconnection components provide a high speed, low latency communications path between the A Series server 100 and the NT server 102. In combination with the physical connection (i.e., feedthrough card 62, cable 64, and EPCCA card 66) and the interconnection device driver 70, these modules simulate a traditional channel adapter-based network processor of the type described above and illustrated in FIG. 1. In this manner, the features and advantages of the present invention are achieved with relatively little modification of the networking components (e.g., CNS 34, NPSUPPORT 40, MCP 12, etc.) on the A Series server 100. With the exception of the LDM 82, NSM-stub 84, LLM-stub 86, and LLAH 88 modules, the main components of the interconnection are implemented as Windows NT kernel-level device drivers to avoid unnecessary data copies that would otherwise occur when transferring data from the NT kernel space to the user space. Each of the foregoing components and modules of the interconnection is described below in more detail.

1. EPCCA Card 66

The EISA Personal Computer Channel Adapter (EPCCA) card 66 plugs into an available EISA bus slot in the NT server 102. The EPCCA card 66 bridges the EISA bus on the NT server 102 to the CS-BUS II of the A Series server 100 via the cable 64 and feedthrough card 62. The feedthrough card 62 plugs into an available channel adapter slot in the IOM 14, providing a direct connection to the data and control lines of the CS-BUS II. Microcode on the EPCCA card 66 emulates an A Series channel adapter.

2. Interconnection Device Driver 70 (PCCA 72 and OPENCA 74)

In the present embodiment, the interconnection device driver 70 comprises a PCCA device driver 72 and an OPENCA device driver 74. The PCCA driver 72 initializes, terminates, configures, and communicates with the EPCCA hardware/microcode 66. The PCCA driver 72 interacts with the OPENCA driver 74 via a procedural interface. This procedural interface passes 32-byte I/O Messages (IOMs) between the EPCCA board 66 and OPENCA 74.

The OPENCA driver 74 acts as an intermediary between PCCA 72 and the rest of the components of the interconnection, as well as providing controller functions for the datapath. OPENCA driver 74 interprets commands received from the A Series server 100 via the PCCA driver 72 and EPCCA card 66, generates results, and sets up memory descriptors for moving data between the NT server 102 and the A Series server 100. OPENCA driver 74 interfaces with the QSP module 76 via a procedural interface; the IOM-based API used by the PCCA driver 72 is hidden from the QSP 76 and other modules of the interconnection.

3. Queue Service Provider (QSP) 76 The QSP 76 provides a message queuing function that is necessary to interface the NSM and LLM-stubs 84, 86, and the LANSG module 78 to their peers on the A Series server 100 via NPSUPPORT 40. The QSP 76 functions analogously to the QSP 28 in a traditional network processor, as described above and illustrated in FIG. 1. Specifically, the QSP 76 and NPSUPPORT 40 exchange control messages to initialize, establish and terminate pipes, configure, and report errors. They also build and parse headers placed at the beginning of data messages. These headers specify message blocking, message length, and remote queue references (RQRs). As mentioned above, RQRs are used to multiplex many point-to-point dialogs over the lines managed by the LANSG module. Entities on the A Series server 100 that correspond to the stations managed by the LANSG module 78 are assigned unique RQRs, as are the stations to which they correspond. These RQRs are then exchanged out of band via NSM/NSM-Stub and LLM/LLM-Stub control dialogs. Once the RQRs have been exchanged, the originator of a message inserts the other side's RQR in the header, so the receiver can assign that message to the appropriate queue. Thus, the QSP 76 enables multiple dialogs to be multiplexed over the physical connection between the A Series and NT servers.

4. LAN Station Group (LANSG) 78

Like the QSP 76, the LANSG 78 functions analogously to the LANSG 26 in a traditional network processor, as described above and illustrated in FIG. 1. LANSG 78 controls the initialization and termination of station groups on particular lines, as well as the individual stations of each group. It also controls the setting and retrieval of attributes for those groups, the reporting of asynchronous indications, and the passing of data messages thereon. In this embodiment, the LANSG 78 communicates via a STREAMS interface to the QSP 76. STREAMS is an industry standard device driver interface popularized on UNIX systems, but also available for Windows NT systems. In the present embodiment, the STREAMS interface is implemented on the NT server 102 using the Mentat Portable Streams for Windows NT (MPS) product available from Mentat, Inc., 1145 Gayley Ave. Suite 315, Los Angeles, Calif. 90024 USA.

Data from the NT server 102 (e.g., data received from the network 15 via a shared NIC 50) that is destined for a network protocol provider on the A Series server 100 is forwarded to the LANSG 78 and then sent through the QSP 76, the interconnection device driver (ICD) 70, and the physical connection to NPSUPPORT 40 on the A Series server 100. In the present embodiment, the LANSG module 78 manages physical lines in a manner similar to the LANSG module 26 of a traditional Unisys network processor. In this embodiment, however, the lines that the LANSG module 78 manages are implemented by network interface cards installed in the NT server 102. For example, the NIC 50 and VLAN 80 installed in the NT server 102 each defines one line managed by the LANSG module 78. More than one NIC 50 can be installed in the NT server 102, each defining a different line of the Unisys networking architecture. However, in accordance with the invention, a simulated FDDI local area network within the memory space of the NT server 102 defines another line within the LANSG module 78. In the present embodiment, the simulated FDDI local area network is always defined as Line 0.

The LANSG module 78 maintains a mapping of line numbers to AdapterNames of the adapter drivers on the NT server 102. Line numbers are assigned to station groups by configuration commands entered on the A Series server 100. The LLM communicates these line numbers to the LLM-stub 86. AdapterNames are assigned by Windows NT as NICs are configured into the NT server 102 and stored in the Windows NT Registry. LANSG 78 will obtain the AdapterNames of those NICs that are bound to LANSG 78 in the Windows NT Registry and will maintain a mapping to the associated line number and other information. The following table illustrates the information maintained for each line number in use:

| Line Number | Adapter Name | Adapter Handle | Media |
|---|---|---|---|
| 0 | always simulated FDDI LAN | obtained from Vlan-Open call | always FDDI |
| 1 | obtained from the registry | obtained from call to NdisOpenAdapter | Ethernet |
| 2 | obtained from the registry | obtained from call to NdisOpenAdapter | " |
| 3 | obtained from the registry | obtained from call to NdisOpenAdapter | " |
| 4 | obtained from the registry | obtained from call to NdisOpenAdapter | " |
| 5 | obtained from the registry | obtained from call to NdisOpenAdapter | " |
| 6 | obtained from the registry | obtained from call to NdisOpenAdapter | " |
| 7 | obtained from the registry | obtained from call to NdisOpenAdapter | " |
| 8 | obtained from the registry | obtained from call to NdisOpenAdapter | " |
| 9 | obtained from the registry | obtained from call to NdisOpenAdapter | " |
| 10 | obtained from the registry | obtained from call to NdisOpenAdapter | " |
| 11 | obtained from the registry | obtained from call to NdisOpenAdapter | " |
| 12 | obtained from the registry | obtained from call to NdisOpenAdapter | " |
| 13 | obtained from the registry | obtained from call to NdisOpenAdapter | " |
| 14 | obtained from the registry | obtained from call to NdisOpenAdapter | " |
| 15 | obtained from the registry | obtained from call to NdisOpenAdapter | " |

5. Virtual LAN (VLAN) 80 and NDIS Miniport Interface Library 81

The elements are described in detail in section II below.

6. Load/Dump Module (LDM) 82

The LDM 82 provides a mechanism for simulating a load of a network processor firmware file (a process that is performed during initialization of traditional network processors) to the CNP platform on the NT server 102 and for initiating a CNP state dump. The LDM resides inside an executable file, CNP.EXE, that is initiated as an NT service when the NT server 102 boots up. As part of the simulated firmware loading, the LDM 82 initiates the NSM-stub process 84, which in turn initiates the LLM-stub process 86, and initiates the QSP 76.

7. Network Services Module Stub (NSM-stub) 84

The NSM-stub module 84 is also part of the CNP.EXE executable and is responsible for carrying out commands/responses sent to it by the NSM 36 (a component of CNS 34) on the A Series server 100. Essentially, it performs the functions of the NSM-stub 30 of a typical Unisys network processor. In the present embodiment, the NSM-Stub 84 interfaces with the QSP module 76 via a STREAMS interface using standard STREAMS calls (i.e., open, close, ioctl, putmsg, getmsg).

8. Link Layer Manager Stub (LLM-stub) 86

The LLM-stub module 86, also part of CNP.EXE, is responsible for carrying out commands/responses sent to it by the LLM 38 (a component of CNS 34) on the A Series server 100. Essentially, it performs the functions of the LLM-stub 32 of a typical Unisys network processor. In the present embodiment, the LLM-Stub 86 likewise interfaces with the QSP module 76 via a STREAMS interface using standard STREAMS calls (i.e., open, close, ioctl, putmsg, getmsg).

9. Link Layer Attribute Handler (LLAH) 88

The LLAH module 88, another module within CNP.EXE, functions similarly to its counterpart in a traditional Unisys network processor. Specifically, the LLAH module 88 is responsible for performing the detailed processing associated with parsing, validating, and building attribute lists. The LLAH enforces attribute range validity rules and checks for inter-attribute consistency. The LLM-Stub 86 is the only module that interfaces with the LLAH.

B. Host Interface Function (HIF)—Alternative Embodiments

In FIG. 3, the interconnection device driver 70, including its PCCA and OPENCA drivers 72, 74 in the present embodiment, and the physical connection formed by the feedthrough card 62, cable 64, and EPCCA card 66, together define a Host Interface Function (HIF). According to another feature of the present invention, the procedural interface between the QSP 76 and the interconnection device driver 70 of the HIF is designed to isolate the QSP 76 from the HIF. This enables the present invention to be employed with different implementations of the HIF. Specifically, the procedural interface between the QSP 76 and the interconnection device driver 70 is established through a process by which each module publishes entry points (i.e., pointers) to the procedures that implement its functionality, along with any required variable values. Another device driver entity called NNSDRLOG.SYS (not shown) maintains a record of these entry points.

The interconnection device driver 70 of the HIF registers the following entry points and attributes:

HifSendBlockToHost( )—a function called by QSP 76 to deliver a block of data to the MCP 12;

HifOpenUnit( )—a function called by QSP 76 to initialize one of several pipes (units) through which data received from the LANSG module 78 can be transmitted to the appropriate entity on the A Series server 100;.

HifCloseUnit( )—a function called by QSP 76 to indicate that one of the pipes (units) is terminated; maxQueuesSupported—a variable initialized by the HIF which QSP 76 can reference to determine how many pipes (queues/units) it can use to send messages to the MCP 12 of the A Series server 100; and platform—a variable initialized by the HIF which identifies (via an enumeration) a particular implementation of the HIF (two alternate HIF implementations are described below and illustrated in FIGS. 4 and 5, respectively). In the present embodiment, these functions and variables are implemented by the OPENCA driver 74 of the interconnection device driver 70.

Likewise, the QSP 76 registers the following entry points:

QspAckBlockToHost( )—a function called by the ICD to indicate to the QSP 76 that a particular block of messages has been successfully delivered to the MCP 12;

QspReset( )—a function called by the ICD to indicate to the QSP 76 that communications with the MCP 12 via the interconnection have been lost, and that pending messages should be flushed; and QspLRPut( )—a function called by the ICD to deliver a block of data from the A Series server 100 to the QSP 76.

In order to invoke one of these functions, a call is made to the registered entry point for that function. As a result of this indirection, different interconnection device drivers can be installed for different implementations of the HIF in a manner that is completely transparent to the QSP 76.

Figure 4:
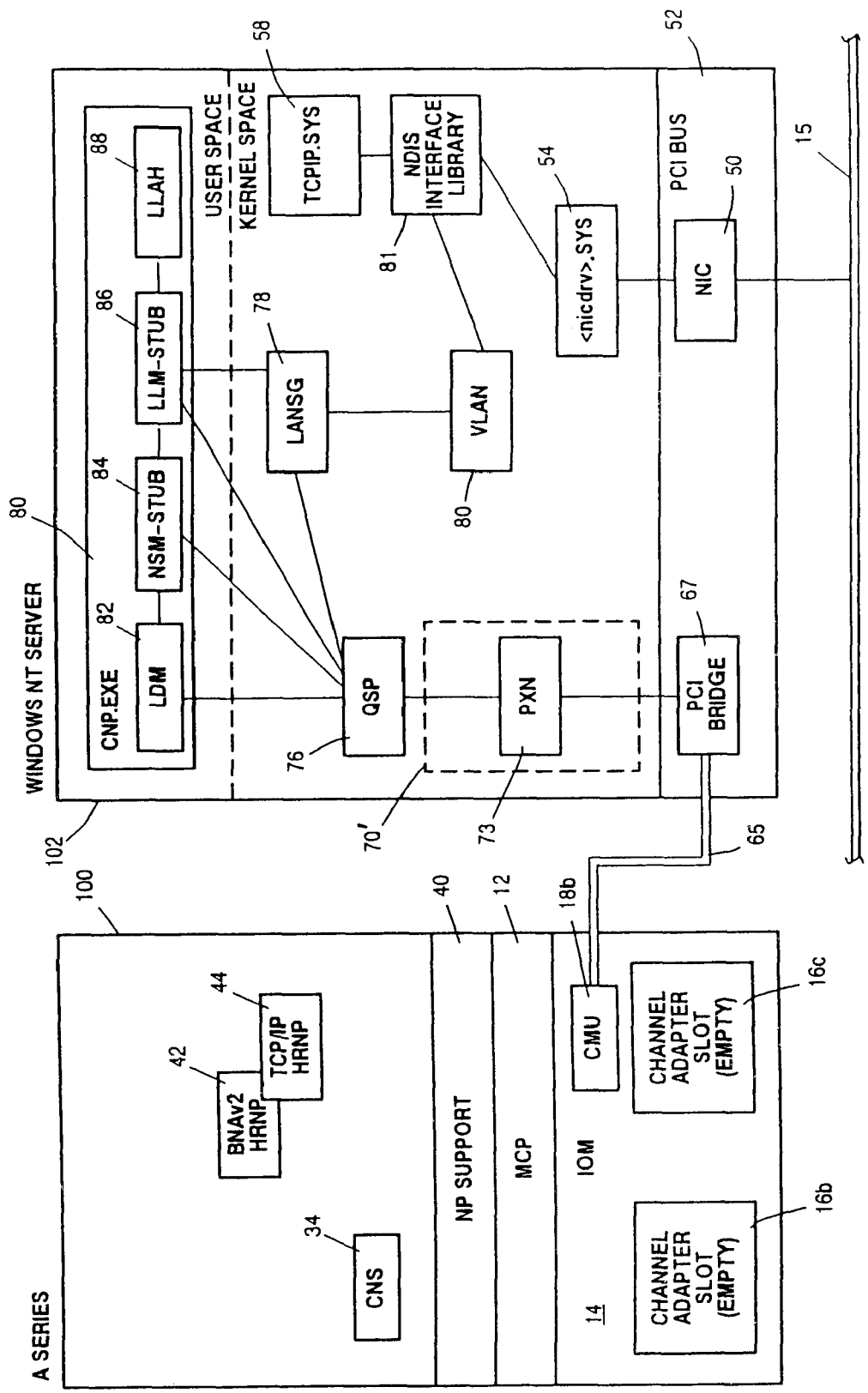
FIG. 4 is a block diagram illustrating an alternative embodiment of an interconnection of the apparatus of FIG. 3.
Figure 5:
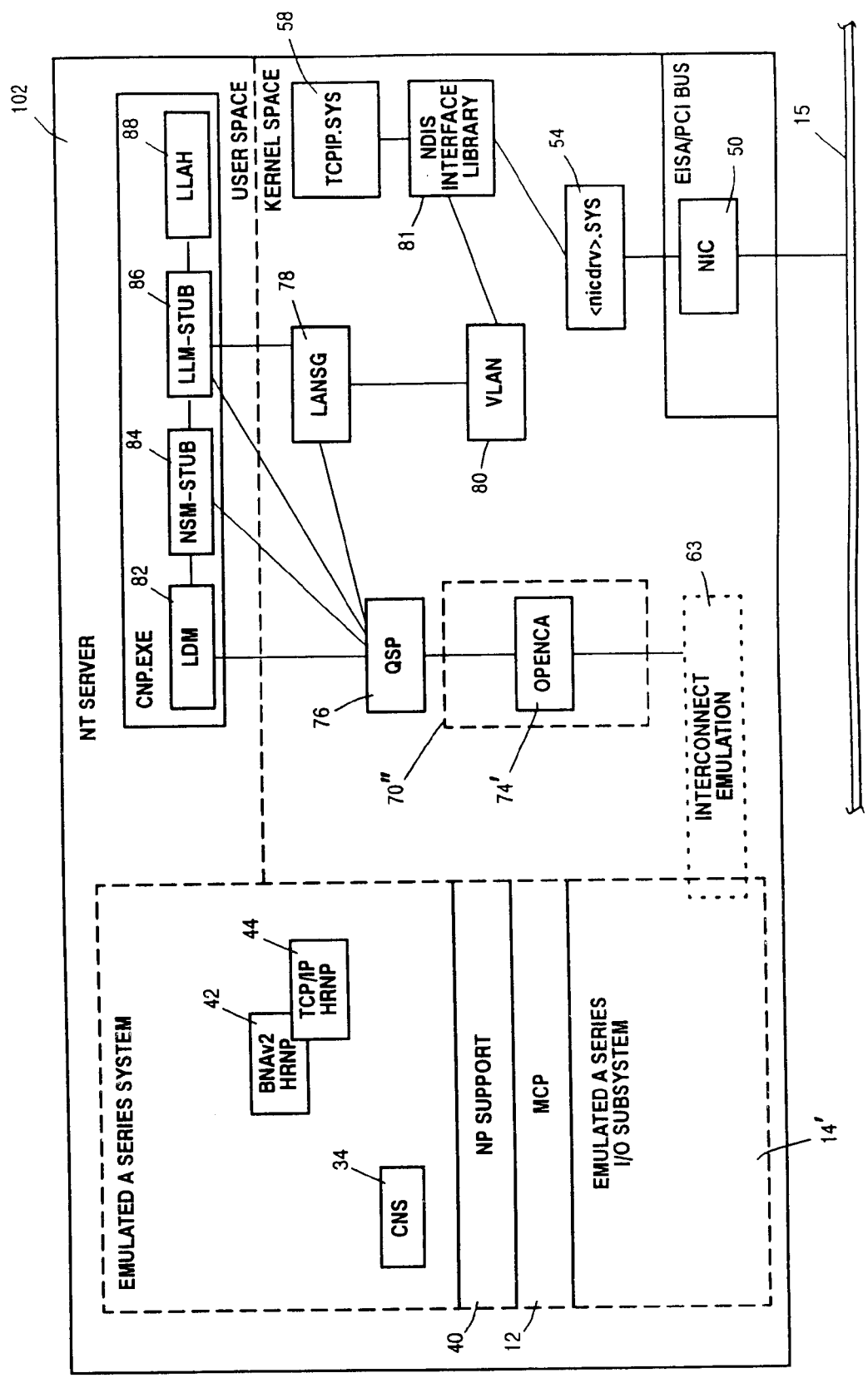
FIG. 5 is a block diagram illustrating yet another embodiment of the interconnection of the apparatus of FIG. 3.

FIGS. 4 and 5 illustrate two alternate embodiments of the HIF, which illustrate the modularity provided by the procedural interface design described above. In FIG. 4, the physical connection (i.e., the feedthrough card 62, cable 64, and EPCCA card 66) is replaced by a PCI Bridge card 67 that connects via a cable 65 directly to a port on one of the CMUs 18b of the IOM 14 of the A Series server 100. By connecting directly to the CMU 18b, some of the latency inherent in the CS-Bus II protocol is avoided. This provides a more direct, higher speed connection between the I/O subsystems of the two servers 100, 102. Because the physical connection is changed, a modified interconnection device driver 70' is provided. The modified interconnection device driver 70' comprises a single device driver module, PXN 73, that provides the interface between the QSP 76 and the hardware on the PCI Bridge card 67. However, the procedural interface, and the mechanism by which the QSP 76 and interconnection device driver 70' register entry points to the respective procedures of that interface is unchanged. Accordingly, the changes to the HIF are transparent to the QSP 76 and the other modules of the present invention that comprise the Cooperative Networking Platform (CNP).

FIG. 5 is an embodiment in which the A Series server 100 is emulated through software in the NT server 102. Unisys provides such an emulated system in its ClearPath HMP NX 4200 series enterprise servers. In this embodiment, the physical connection is emulated such that it becomes a memory-to-memory connection 63 between the memory space of the emulated I/O subsystem 14' and the memory space of the NT system 102. The emulated connection 63 functions in a manner similar to the feedthrough card 62, cable 64, EPCCA card 66, and PCCA 72 components of the hardware implementation of FIG. 3. The interconnection device driver 70' in this embodiment comprises a modified form 74' of the OPENCA module 74 of the implementation of FIG. 3. Again, however, the procedural interface between the modified OPENCA module 74' and the QSP 76 is not changed, so that the emulated A Series server 100 and its emulated connection 63 to the NT server 102 is transparent to the QSP 76 and the other modules of the present invention that comprise the Cooperative Networking Platform (CNP).

C. Operation

FIGS. 6A–6F provide further details of how data is transferred between the A Series server 100 and the NT server 102 via the interconnection device driver of the HIF and the QSP module 76. The details provided in FIGS. 6A–6E are applicable to any of the three embodiments of the HIF shown in FIGS. 3, 4, and 5. Thus, as used in the following discussion, the term interconnection device driver (ICD) refers to any of the three interconnection device driver embodiments described above.

The QSP 76 multiplexes multiple client dialogs (e.g., dialogs with the NSM-stub and LLM-stub modules 84, 86 and with the different stations defined by LANSG 78) over one or more transfer units. Units are an abstraction of the communication paths supported by the interconnection device driver (ICD). Units may be logical dialogs or physical devices. In order to more fully utilize the unit resources, the QSP 76 may aggregate messages waiting for transfer over a same unit into a block that can be transferred in a single operation. The QSP 76 supports such blocking by providing a Message-Count field in its message headers. The first message header in a block contains the number of messages that the block contains in its Message-Count field. Subsequent message headers within the block have a zero value in that field.

The ICD then takes each block and programs the physical connection (i.e., the EPCCA board 66, the PCI Bridge card 67, or the emulated memory-to-memory connection 63, depending upon the implementation) to transfer the block to the A Series server 100. In the reverse direction, the ICD is awakened when a message is transferred via the physical connection into the memory of the NT server 102, either by an interrupt (in the case of the hardware connections of FIGS. 3 and 4) or by a function call (in the case of the emulated connection 63 of FIG. 5). The ICD delivers the received message to the QSP 76, which in turn, distributes it to the appropriate client dialog (e.g., NSM-stub 84, LLM-stub 86, or a given station defined by LANSG 78), based on the RQR associated with the message.

Figure 6A:
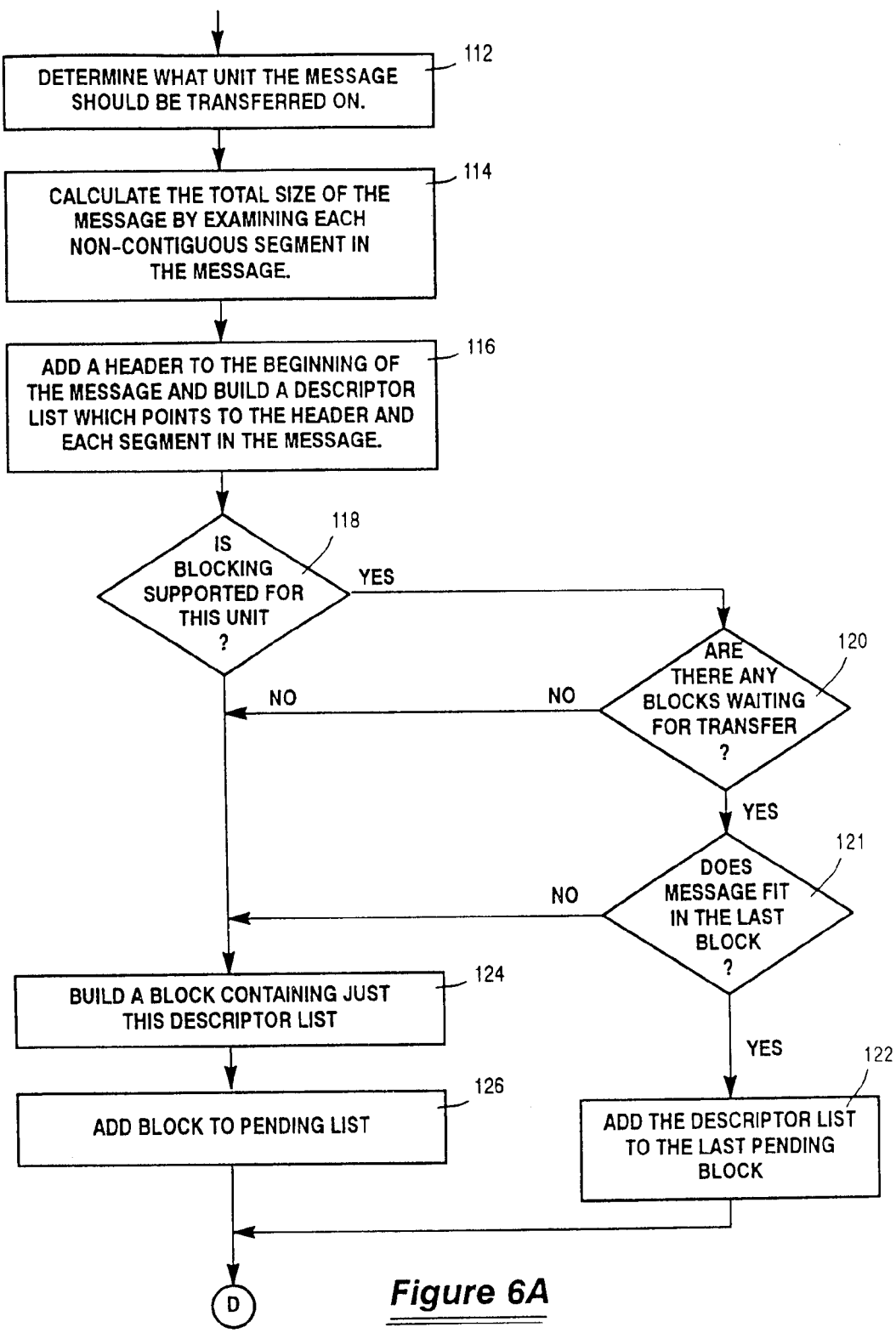
FIGS. 6A–F are flow diagrams that further illustrate the operation of the interconnections illustrated in FIGS. 3–5.
Figure 6B:
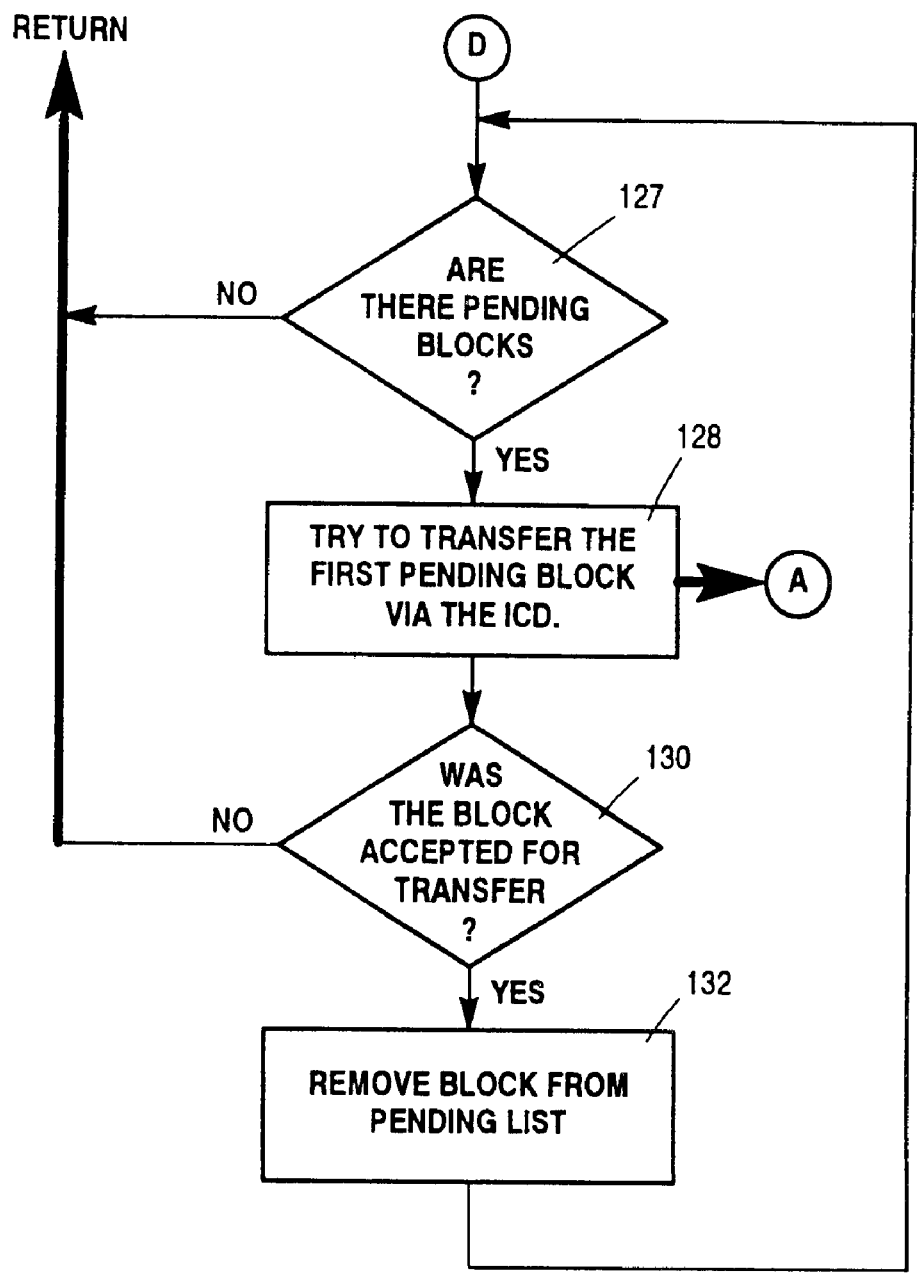

FIGS. 6A–6D provide further information concerning the steps performed by the QSP 76 and ICD in transferring messages from a client on the NT server 102 (e.g., NSM-stub 84, LLM-stub 86, or a station defined by LANSG 78) to the A Series server 100 via the physical connection. This transfer process begins when a client, for example, the LANSG module 78, which may need to pass data received from TCPIP.SYS 58 to the A Series server 100, calls the QSP 76 requesting that a message (e.g., the data received from the network) be transferred to the A Series server 100. A parameter is passed with the request that points to non-contiguous message segments that comprise the full message. At step 112, the QSP 76 determines on what unit the message should be transferred. Next, at step 114, the QSP 76 calculates the total size of the message by examining each non-contiguous segment in the message. At step 116, a header is added to the beginning of the message, and a descriptor list is built that points to the header and to each segment in the message. Next, at step 118, the QSP 76 determines whether blocking (described above) is supported for this unit. If so, at step 120, the QSP 76 determines whether any blocks are presently waiting for transfer. If so, at step 121, the QSP 76 determines whether the message will fit in the last pending block. If so, then at step 122, the QSP 76 adds the descriptor list to the last pending block. Control then passes to step 127 (FIG. 6B).

If in step 118, blocking is not supported for this unit, or if in step 120 it is determined that there are no blocks presently waiting for transfer, or if in step 121 it is determined that the message will not fit in the last pending block, then control passes in all three cases to step 124. At step 124, the QSP 76 builds a block containing only the descriptor list built in step 116. Next, at step 126, the newly created block is added to the list of pending blocks. Control then passes to step 127 (FIG. 6B).

In FIG. 6B, the QSP 76 determines whether any blocks are pending at step 127. If not, the QSP 76 simply returns to the client. However, if there are pending blocks to be transferred, then control passes to step 128.

Figure 6C:
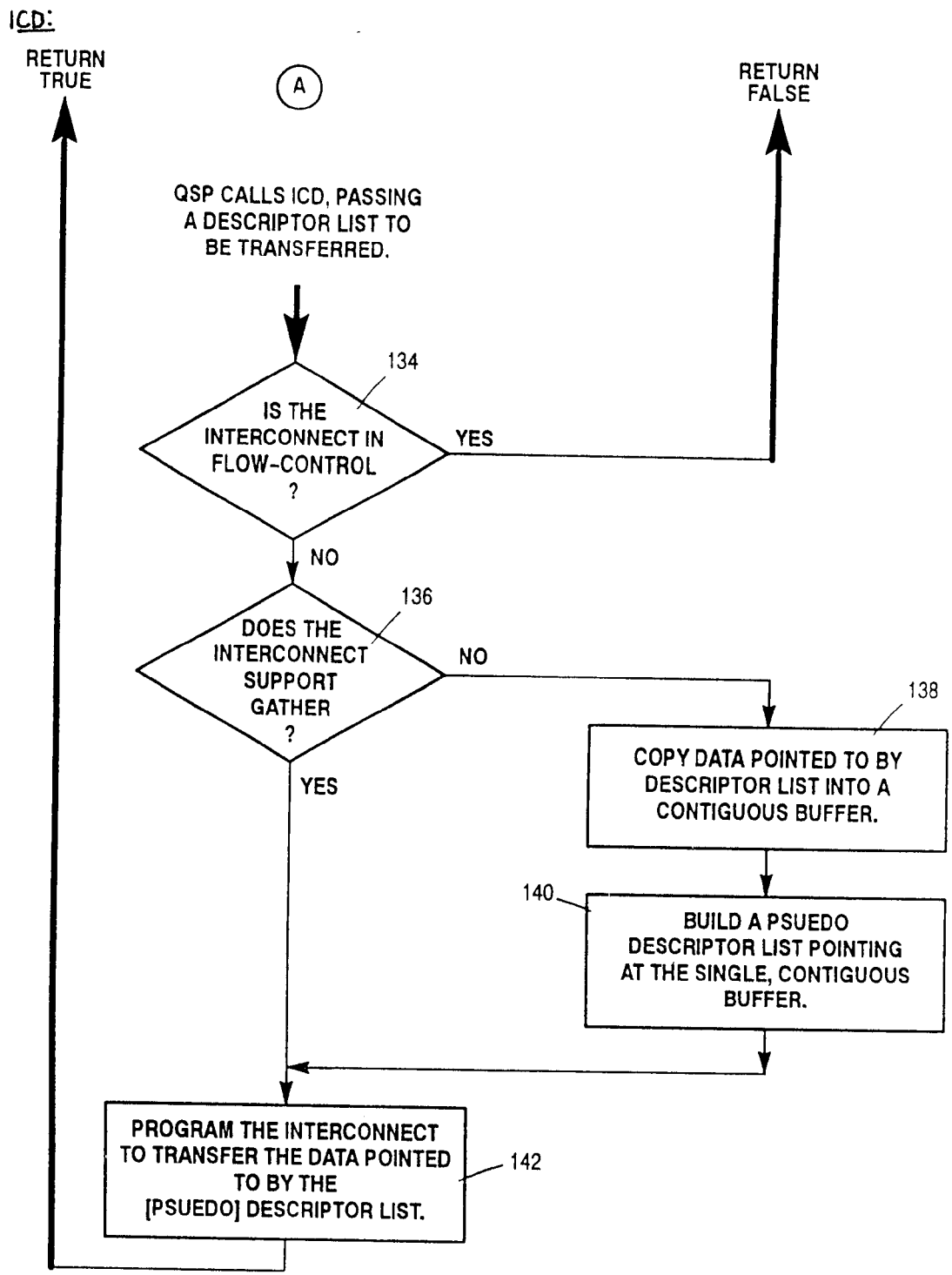

At step 128, the QSP 76 attempts to send the first block in the list of pending blocks to the ICD by invoking the HifSendBlockToHost( ) procedure of the ICD. As indicated by the arrow labeled "A", the ICD begins processing the request at that point. The steps performed by the ICD are illustrated in FIG. 6C. Still referring to FIG. 6B, however, the QSP's processing continues to step 130, where the QSP 76 determines whether the ICD accepted the block for transfer. If so, that block is removed from the pending list at step 132, and control loops back to step 127 where the QSP 76 again checks whether there are any pending blocks to be transferred and processing continues for any such subsequent blocks. However, if in step 130 it is determined that the ICD did not accept a given block for transfer, then the QSP 76 returns to the client, leaving the block containing the message to be sent on the pending list.

As shown in FIG. 6C, the ICD begins processing the HifSendBlockToHost( ) request from the QSP at step 134, where it determines whether the physical connection is in flow-control mode. Flow-control mode is a mode in which the MCP operating system 12 of the A Series server 100 is not prepared to receive data on the specific unit, for example, because no buffer is available. If the physical connection is in flow-control mode, the ICD returns a value of "FALSE" to the QSP 76 and stops processing the transfer at this point. If the physical connection is not in flow-control mode, then control passes to step 136 where the ICD determines whether the physical connection supports a Gather function. Gather is the ability to transfer data from non-contiguous memory regions in one operation. If the physical connection does not support a Gather capability, control passes to step 138 where the ICD copies the data pointed to by the descriptor list (passed to it by the QSP 76) into a contiguous buffer. Next, at step 140, the ICD builds a pseudo descriptor list that points at the single, contiguous buffer. Control then passes to step 142.

At step 142, whether entered directly from step 136 (Gather supported) or from step 140 (Gather not supported), the ICD programs the physical connection (i.e., the EPCCA board 66, the PCI Bridge card 67, or the emulated memory-to-memory connection 63 depending upon the particular embodiment) to transfer the data pointed to either by the descriptor list received from the QSP 76 (Gather) or the pseudo descriptor list created in step 140 (no Gather). The ICD then returns a value of "TRUE" to the QSP 76.

Figure 6D:
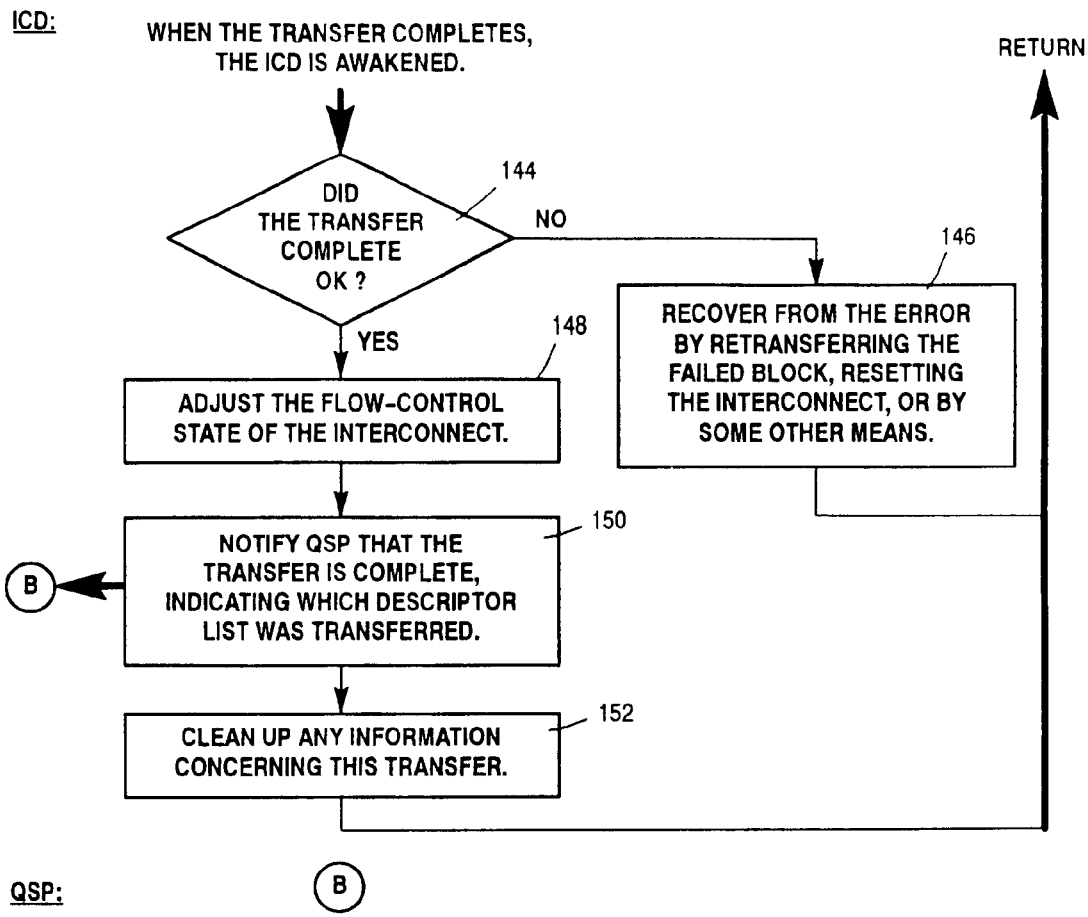
Figure 6D:
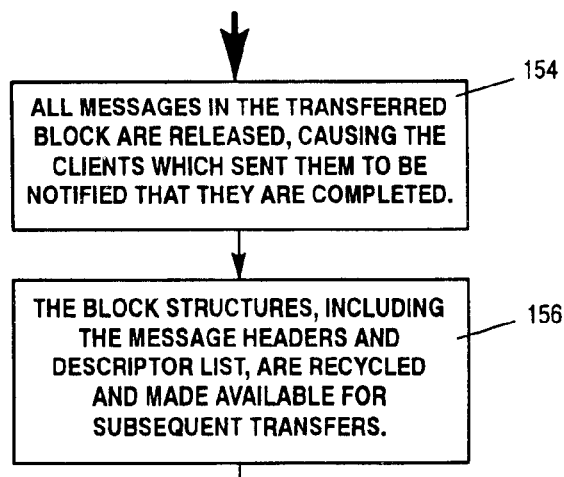

FIG. 6D illustrates the steps performed by the ICD and QSP 76 when the transfer completes. As shown, when the transfer completes, the ICD is awakened. At step 144, the ICD receives an indication of whether the transfer completed successfully. If not, control passes to step 146 where the ICD attempts to recover from the error by, for example, retransferring the block in question, resetting the physical connection, etc. If the transfer completed successfully, control passes to step 148. At step 148, the ICD adjusts the flow-control state of the physical connection. This is done because in the embodiments of the physical connection described above, the interconnection is polled. When a transfer completes, the interconnection may not be able to initiate another transfer until it is polled again, so the flow-control state is adjusted to reflect this. Next at step 150, the ICD calls the QspAckBlockToHost( ) procedure to notify the QSP that the transfer is complete and to indicate which descriptor list was transferred. At step 152, the ICD performs a cleanup procedure and then returns.

As shown at point "B", when the QSP 76 receives the QspAckBlockToHost( ) indication from the ICD, notifying it that the transfer completed successfully, the QSP 76 enters step 154 where all messages in the transferred block are released, causing the clients that sent them to be notified that they were successfully transferred. At step 156, the block structures, including the message headers and descriptor list, are recycled and made available for subsequent transfers. Control then loops back to step 127 of FIG. 6B for processing of subsequent blocks.

Figure 6E:
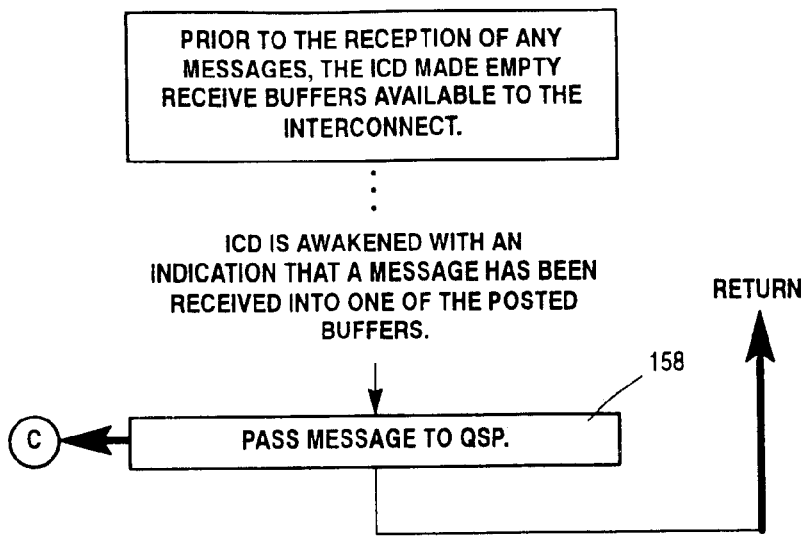
Figure 6E:
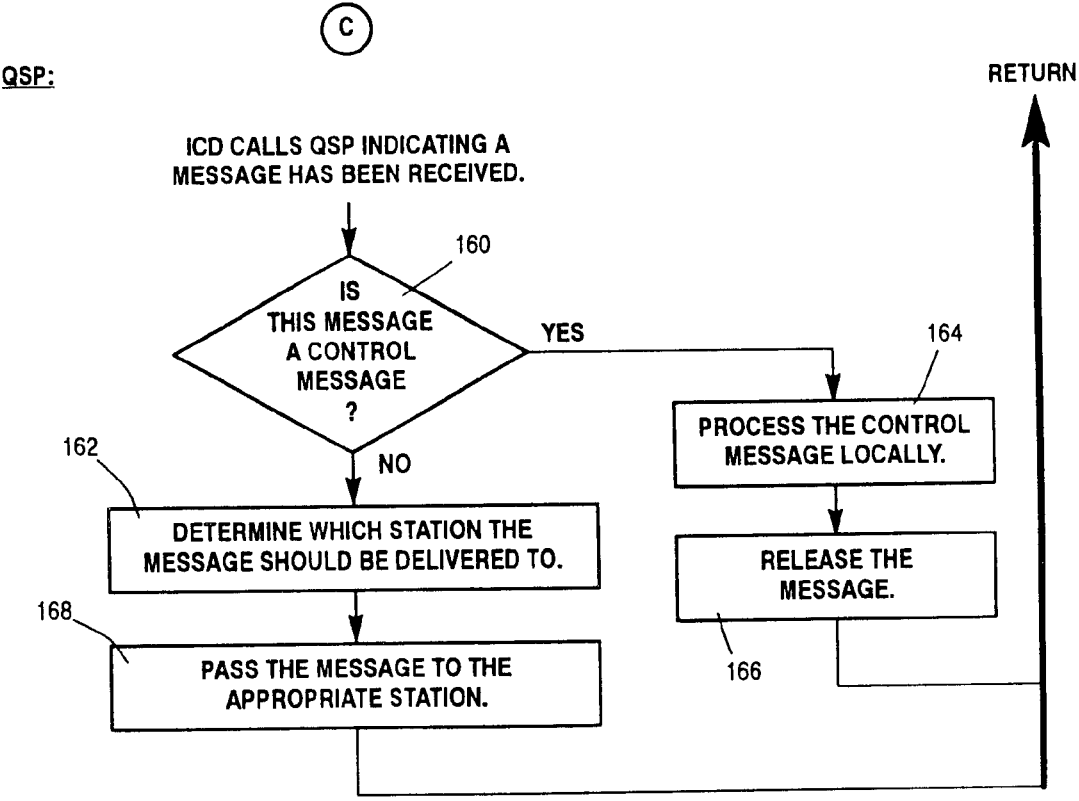
Figure 6F:
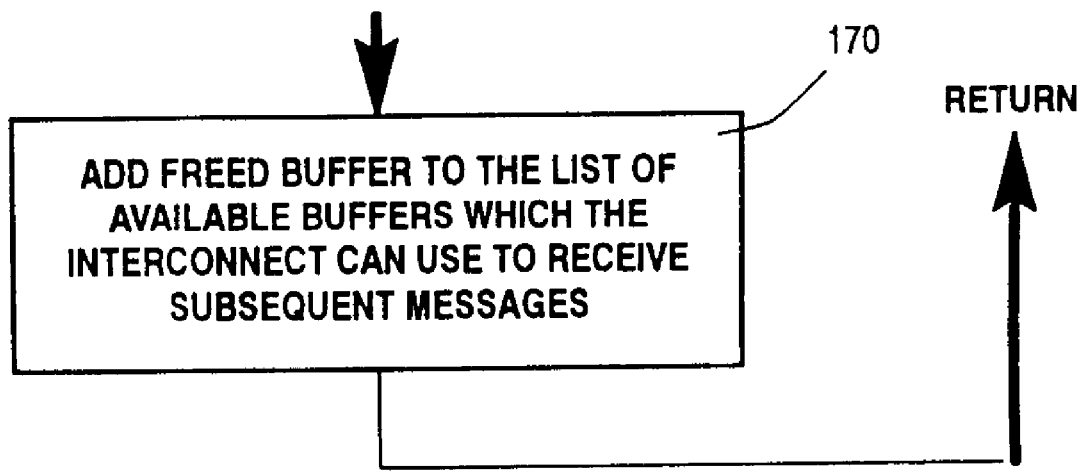

FIGS. 6E–6F illustrate the steps performed by the ICD and QSP 76 in transmitting a message from the A Series server 100 to the NT server 102. As shown, prior to the reception of any messages from the A Series server 100 via the physical connection, the ICD makes empty receive buffers available to the connection. When a message is transferred from the A Series server 100 to the NT server 102 via the physical connection (e.g., through the feedthrough card 62, across cable 64, and through the EPCCA card 66 in the embodiment of FIG. 3), the ICD is awakened with an indication that a message has been received into one of the empty receive buffers that it posted. At step 158, the ICD passes the message to the QSP 76 using the QspLRPut( ) function and returns.

At step 160, the QSP 76 determines whether the message is a control message. If so, at step 164, the QSP 76 processes the control message locally, and then releases the message at step 166 and returns. If the message is not a control message, then control passes to step 162. At step 162, the QSP 76 determines from the RQR in the message header which station is to receive the message. Next, at step 168, the message is passed to the appropriate station.

As shown in FIG. 6F, when the QSP 76 or one of its clients releases the message buffer, a free message callback function of the ICD is invoked. At step 170, the ICD adds the freed buffer to the list of available buffers which the physical connection can then use to receive subsequent messages in the manner described above.

II. VLAN 80

As noted above, VLAN 80 provides a high speed communications interface between the A Series server 100 and the NT server 102. As shown in each of the embodiments of FIGS. 3–5, a Virtual LAN Miniport driver (VLAN) 80 is provided in the communications path between the A Series server 100 and the NT server 102. Generally, VLAN 80 is an NDIS device driver which appears as a "Virtual LAN" to both the A Series TCP/IP network provider and to the Windows NT-based TCP/IP stack (TCPIP.SYS 58). VLAN 80 implements a high speed, low latency path between an A Series server 100 and an NT server 102 such that both servers may use their native mechanisms to communicate with each other.

VLAN 80 is a Windows NT Network Driver Interface Specification (NDIS) driver that simulates an NDIS Fiber Distributed Data Interface (FDDI) network interface card (NIC) Miniport driver to TCPIP.SYS 58 on the NT server 102 and exchanges data with the LANSG 78 via line 0 for delivery to and receipt from the A Series server 100. In other words, VLAN 80 appears to be an FDDI NIC to TCPIP.SYS 58 and to the LANSG 78. However, in reality, VLAN 80 is just a NDIS device driver that simulates an FDDI interface card to the Windows NT NDIS Wrapper. VLAN 80 provides the same external interfaces as any other NDIS driver. VLAN 80 conforms to the standards set by Microsoft for NDIS Miniport Drivers in order to remain transparent to the higher layer protocols. VLAN 80 has a procedural interface to the LANSG module 78 which is not bound by strictly enforced interface definitions. In the preferred embodiment, the interface to LANSG is based upon a modified set of the rules that are enforced by the NDIS Wrapper.

In accordance with the invention, VLAN 80 emulates an FDDI-like LAN, although it is really point-to-point within the memory of the NT server 102. Because a standard LAN such as FDDI is emulated, the communications protocol, for example, TCP/IP on both servers, can work unmodified. Likewise, all programs that use TCP port files on the MCP 12, and WinSock TCP sockets on the NT server 102 can intercommunicate without changes. Also, because the LAN connection is actually the memory of the NT server 102, the latency of a message going from the NT server 102 to MCP 12 or vice-versa is small, and the VLAN 80 can sustain a higher transaction rate than other channel adapters. Also, emulating an FDDI LAN allows the use of segment sizes larger than can be supported over Ethernet (4500 bytes versus 1500 bytes for Ethernet). Moreover, because the overhead of each segment is spread out over larger segments, the overall data throughput is correspondingly higher.

In a preferred embodiment, VLAN 80 implements the Miniport NIC functions that are called from the NDIS 3.0 Miniport Interface Library 81. As known by those skilled in the art, NDIS defines the interface to TCPIP.SYS 58 as a set of procedure calls. Chapter 7 of the Windows NT version 3.51 Driver Development Kit, Network Drivers Design Guide describes the interaction between the NT server's operating system, the NDIS Miniport Interface Library 81, and a Miniport Driver. Since VLAN 80 is bound to TCPIP.SYS 58 and TCPIP.SYS 58 is configured to execute at system initialization time, VLAN 80 will be started by the NT server 102 automatically, prior to the start of TCPIP.SYS 58.

The initial entry point for VLAN 80 into the NDIS Miniport Interface Library 81 is the function DriverEntry which is responsible for registering all of the device driver entrypoints with the NDIS Miniport Wrapper. DriverEntry is a VLAN exported function which is called by Windows NT to activate and initialize the VLAN driver (VLAN.SYS). Registering the Miniport entrypoints causes an Initialize-Handler function to be called which is responsible for reading any necessary information from the Windows NT Registry and having it stored in the I/O Adapter structure for VLAN 80. For example, five Windows NT Registry entries may be used for VLAN: MaximumPacketSize, TransmitBufferSpace, ReceiveBufferSpace, TransmitBlockSize, and ReceiveBlockSize having values which are used by VLAN 80 to respond to queries from the NDIS Miniport Wrapper. When TCPIP.SYS 58 is configured to use a particular IP address on the VLAN "adapter," TCPIP.SYS 58 puts an entry in the Windows NT Registry. Also, the Miniport Adapter structure is allocated prior to registering with the Miniport Wrapper. The Adapter structure contains all the state information about the emulated VLAN NIC 80 and contains the values of all counters that can be inquired upon through query calls from LANSG 78.

When an NDIS Miniport Driver registers, it passes the entrypoints for a list of procedures to the Miniport Wrapper. Accordingly, the required entrypoints, and the procedure names used within VLAN 80 are assigned to NDIS Miniport Wrapper functions. Typically, many of these entrypoint addresses are listed as NULL, and all of the interrupt handling function entrypoints are NULL because VLAN 80 is not interrupt driven. In a preferred embodiment, VLAN 80 uses no interrupts at all and a timer is used to invoke portions of VLAN 80 that must run at the Windows NT Dispatch level.

A. NDIS To VLAN Interface

The following are the entrypoint function names for procedure calls from the NDIS Miniport Interface Library 81 to VLAN 80 that are registered with the NDIS Miniport Interface Library 81 by VLAN 80 to act as an NDIS Miniport NIC driver:

| NDIS Miniport NIC Driver Entrypoint Functions | VLAN NIC Driver Function Name and Purpose |
|---|---|
| CheckForHangHandler | NULL |
| DisableInterruptHandler | NULL |
| DriverEntry | DriverEntry: Notifies VLAN 80 that it has just been loaded and allows it to initialize its data structures and interfaces. |
| EnableInterruptHandler | NULL |
| HaltHandler | VLAN_Halt: Halts VLAN 80 and frees all of its resources. |
| HandleInterruptHandler | NULL |
| InitializeHandler | VLAN_Init: Initializes VLAN 80. |
| ISRHandler | NULL |
| QueryInformationHandler | VLAN_Query: Queries the value of an attribute of VLAN 80. |
| ReconfigureHandler | NULL |
| ResetHandler | VLAN_Reset: Resets the software state of VLAN 80. |
| SendHandler | VLAN_Send: Indicates that data from a bound transport-level driver is to be sent on the the virtual LAN by VLAN 80. |
| ShutdownHandler | VLAN_Shutdown: Shuts down VLAN 80. This procedure is registered with the NDIS Miniport Interface Library 81 separately from the other entry points. |
| TransferDataHandler | VLAN_Transfer: Indicates that some portion of the data that was previously indicated as received on the virtual LAN by VLAN 80 is to be transferred to the NDIS Wrapper for forwarding to the bound transport-level drivers. |

B. VLAN To NDIS Interface

VLAN 80 makes various procedure calls to the NDIS Miniport Interface Library 81 that are specified in Chapter 7 of the afore-mentioned Windows NT version 3.51 Driver Development Kit, Network Drivers Design Guide. For example, upon receipt of VND_ReceiveComp from LANSG 78 (see below), NdisMSendComplete is called to indicate to the NDIS Miniport Interface Library 81 that the data transfer is now complete. On the other hand, when VND_Send is called by LANSG 78 to send data across the VLAN 80, NdisMFddiIndicateReceive is also called to inform TCPIP.SYS 58 (through NDIS) that receive data is available to be transferred. Similarly, NdisMFddiIndicateReceiveComplete is called by VLAN 80 to inform the NDIS Miniport Interface Library 81 that the forwarding of data to the bound transport-level drivers (FDDI) is complete. Other calls may be used pursuant to the Windows NT network drivers design guide.

C. VLAN To LANSG Interface

Several procedures are called by VLAN 80. The procedural interface is as follows:

| Procedure | Purpose of Procedure |
|---|---|
| LANSG_Receive | Called by VLAN 80 to indicate that TCPIP.SYS 58 has sent a packet across the vitrual LAN for receipt by the A Series server 100. |
| LANSG_SendComp | Called by VLAN 80 to indicate that a previously sent message by the A Series server across the virtual LAN has been indicated to the NDIS shell as received and has been transferred to TCPIP.SYS 58. |

D. LANSG To VLAN Interface

On the other hand, the procedure calls from LANSG 78 to VLAN 80 may include the following:

| Procedure | Purpose of Procedure |
|---|---|
| VND_Open | Indicates that the adapter is open and ready to send/receive data. |
| VND_Close | Indicates that the adapter should be closed and can no longer pass data received from the VLAN 80 to the LANSG 78. |
| VND_Query | Queries attributes of the adapter. |
| VND_ReceiveComp | Indicates that a previous LANSG_Receive call is now complete. |
| VND_Send | Sends data across VLAN 80. When called, VLAN 80 will call NdisMFddiIndicateReceive to inform TCPIP.SYS 58 (through NDIS) that receive data is available to be transferred. |

Figure 7:
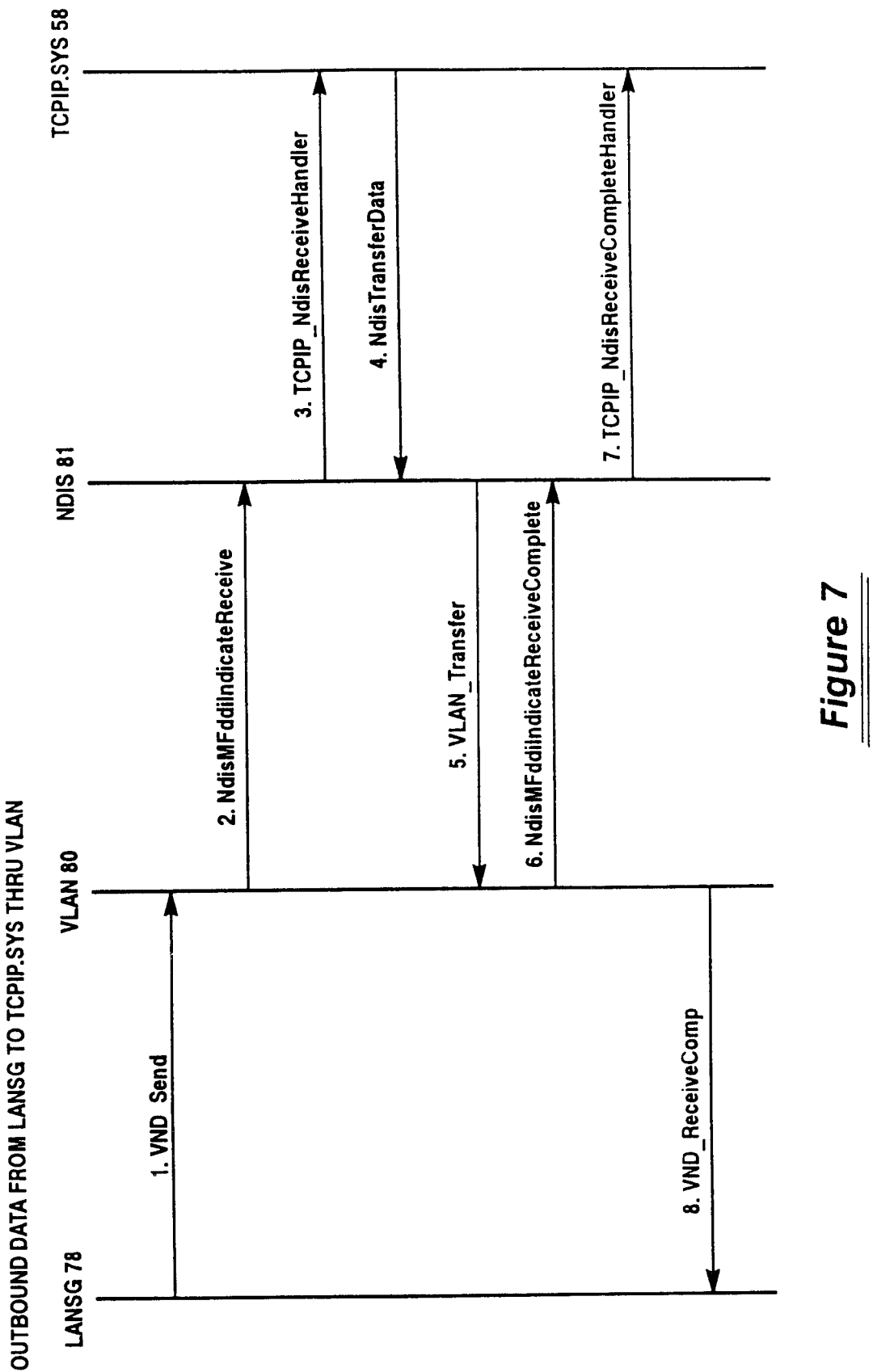
FIG. 7 illustrates the transport of outbound data from the A Series server and LANSG to TCPIP.SYS of the NT server through the virtual LAN of the invention.

FIG. 7 illustrates the transport of outbound data from LANSG 78 to TCPIP.SYS 58 through VLAN 80 via the interfaces described above. The NDIS 3.0 architecture requires a data copy when received data is indicated to NDIS subsequent to a call to VND_Send; however, the data copy is not necessary if the entire data buffer being transferred from VLAN 80 to the NDIS Miniport Interface Library 81 fits into a Lookahead Buffer. However, if the data buffer to be transferred is larger than the Lookahead Buffer, the NDIS Miniport Interface Library 81 can call VLAN_Transfer at any time after NdisMFddiIndicateReceive is called. In most cases, this will occur even before the NDIS Miniport Interface Library 81 returns from the call to NdisMFddiIndicateReceive. Therefore, a state variable is preferably maintained within each packet structure that will indicate how much progress has been made in transferring data from LANSG 78 to the NDIS Miniport Interface Library 81. LANSG_SendComp is not called until the data transfer has been completed. The VLAN Miniport driver waits to call LANSG_SendComp because that call indicates to the rest of the system (LANSG 78 and QSP 76, for example) that the NDIS Miniport Interface Library 81 is finished with the packet and that the associated memory can be released.

If VLAN 80 was unable to complete the transfer of data to the NDIS Miniport Interface Library 81 by the time it has reached the end of the VND_Send function, it will return a status pending indication. If the complete packet has been transferred prior to VLAN 80 reaching the end of the VND_Send function, it will return NDIS_STATUS_SUCCESS. Since LANSG_SendComp is always called when VLAN 80 is finished with the packet, LANSG 78 does not have to act upon the value of the return variable in the VND_Send function. Since VLAN_Transfer always returns Status_Success, no call to NdisMTransferDataComplete is necessary. The NdisMTransferDataComplete function is used for NIC drivers that return a status of status pending, indicating asynchronous data transfer. In other words, the data transfer process from VLAN 80 to the NDIS Miniport Interface Library 81 is always synchronous.

Figure 8:
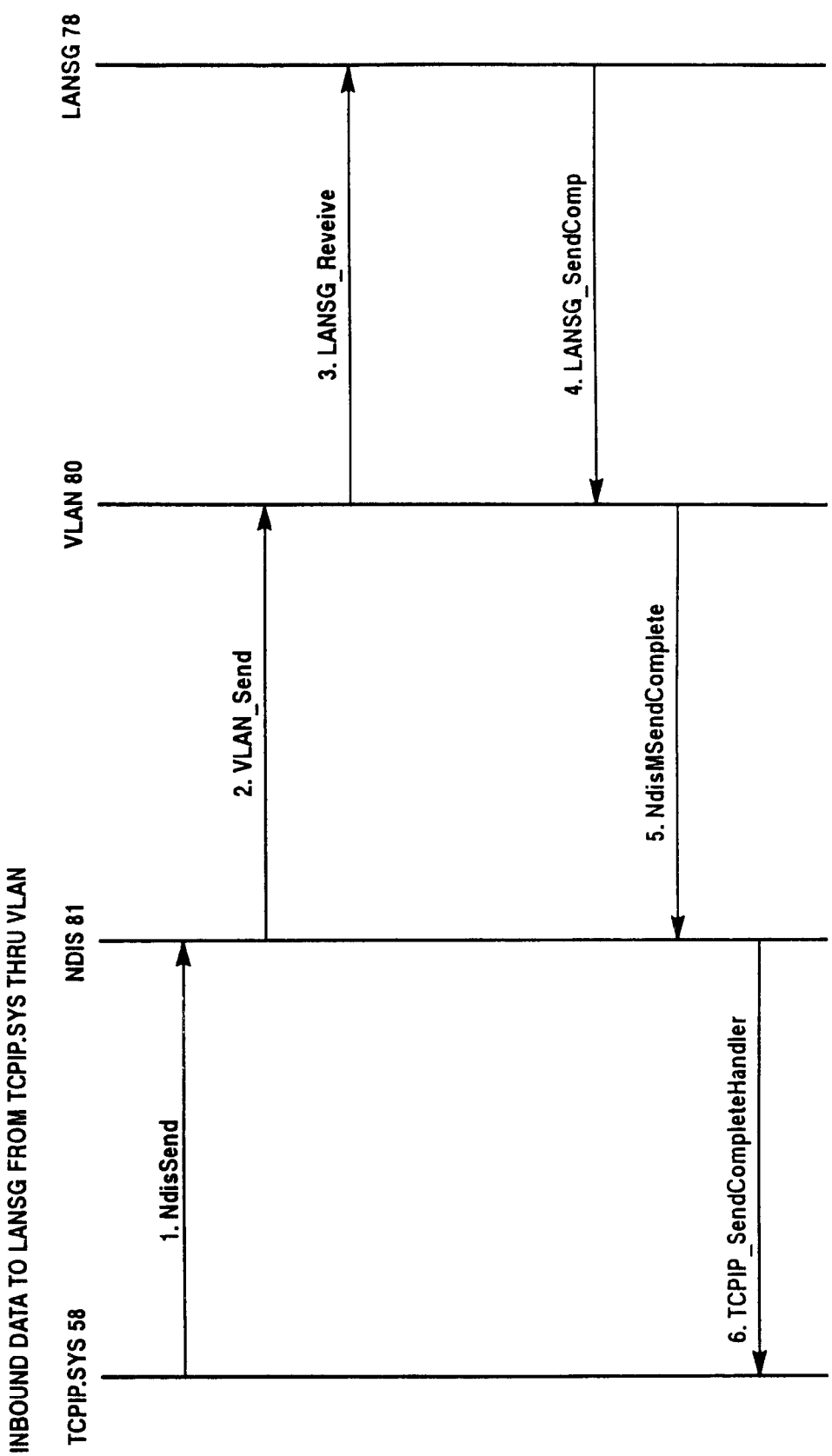
FIG. 8 illustrates the transport of inbound data to the A_Series server and LANSG from TCPIP.SYS of the NT server through the virtual LAN of the invention.

FIG. 8 illustrates the transport of inbound data to LANSG 78 from TCPIP.SYS 58 through VLAN 80 via the interfaces described above. In particular, FIG. 8 illustrates the method of passing data from the NDIS Interface Library 81 to LANSG 78, and ultimately to the MCP 12. The illustrated technique involves no data copies until the packet is moved from the NT system 102 to MCP 12 of the A Series server 100. The NdisMSendComplete indication is not returned to the NDIS Interface Library 81 until LANSG 78 has completed any manipulation of the data packet that is necessary.

VLAN 80 also may issue two types of information request: Query and Set. The information request is stated in terms of OIDs (Object Attribute Identifiers) with four byte values having the encoding described in the table from Chapter 4 of the Windows 3.51 DDK Network Drivers manual, herein incorporated by reference.

VLAN 80 uses a Query Information function to respond to information requests. The format of this function call is as follows:

```
NDIS_STATUS
VLAN_Query{
    IN NDIS_HANDLE MiniportAdapterContext,
    IN NDIS_OID Oid,
    IN PVOID InformationBuffer,
    IN ULONG InformationBufferLength,
    OUT PULONG BytesWritten,
    OUT PULONG BytesNeeded
}
```

The structure of this function is a switch with a case for each OID supported. VLAN 80 fills in the results with calculated or preset values. If the InformationBufferLength is too small to contain the result of the Query, BytesNeeded is filled with the minimum size for the InformationBuffer, and an error is returned.

The Set Information function is similar in structure to the Query Information function and is again just a switch based upon the OID. Is stores the values from the InformationBuffer in the adapter structure pointed to by the MiniportAdapterContext parameter.

E. Operation Of VLAN

Figure 9:
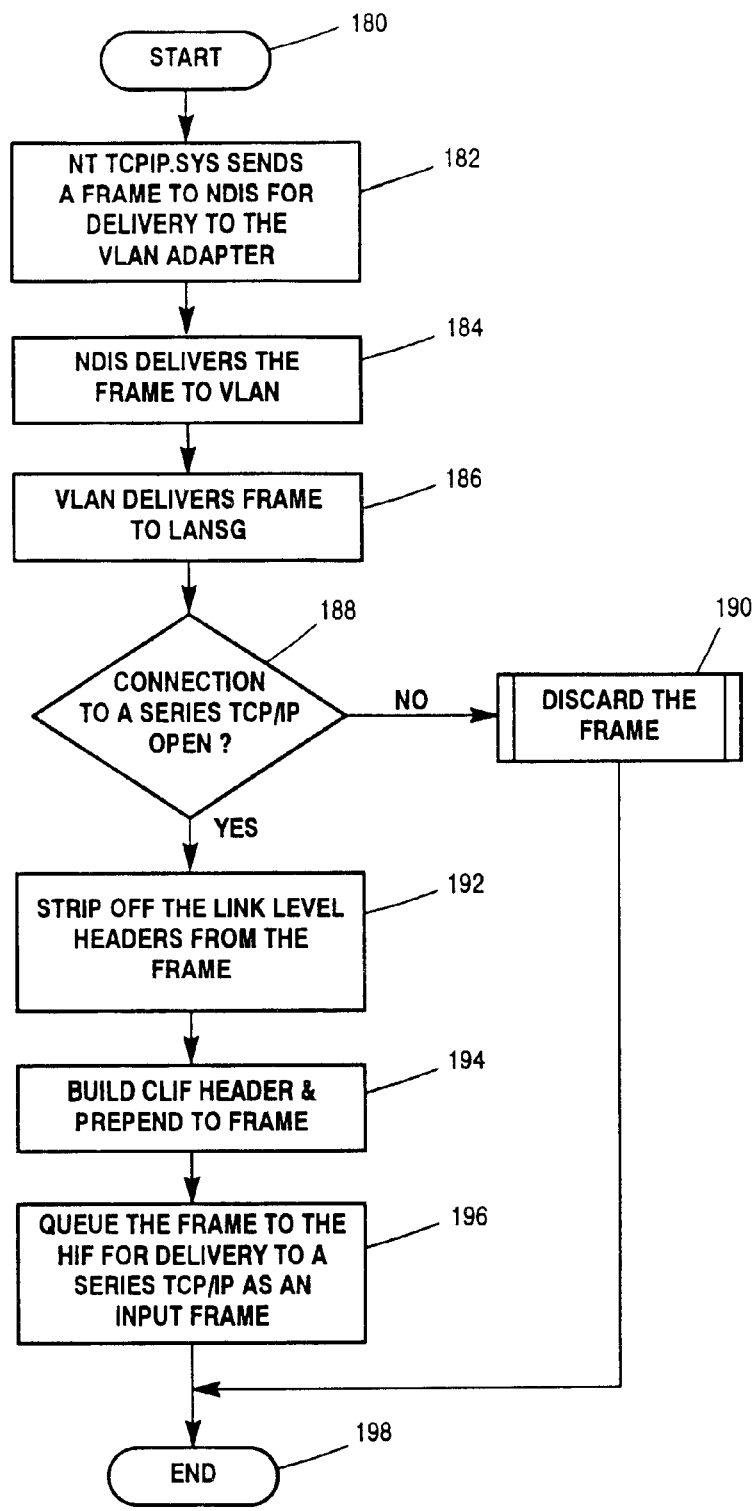
FIG. 9 illustrates the steps performed by the virtual LAN and LAN station group when a frame is sent for output over the virtual LAN adapter by TCPIP.SYS on the NT server to the A Series TCP/IP HRNP.
Figure 10:
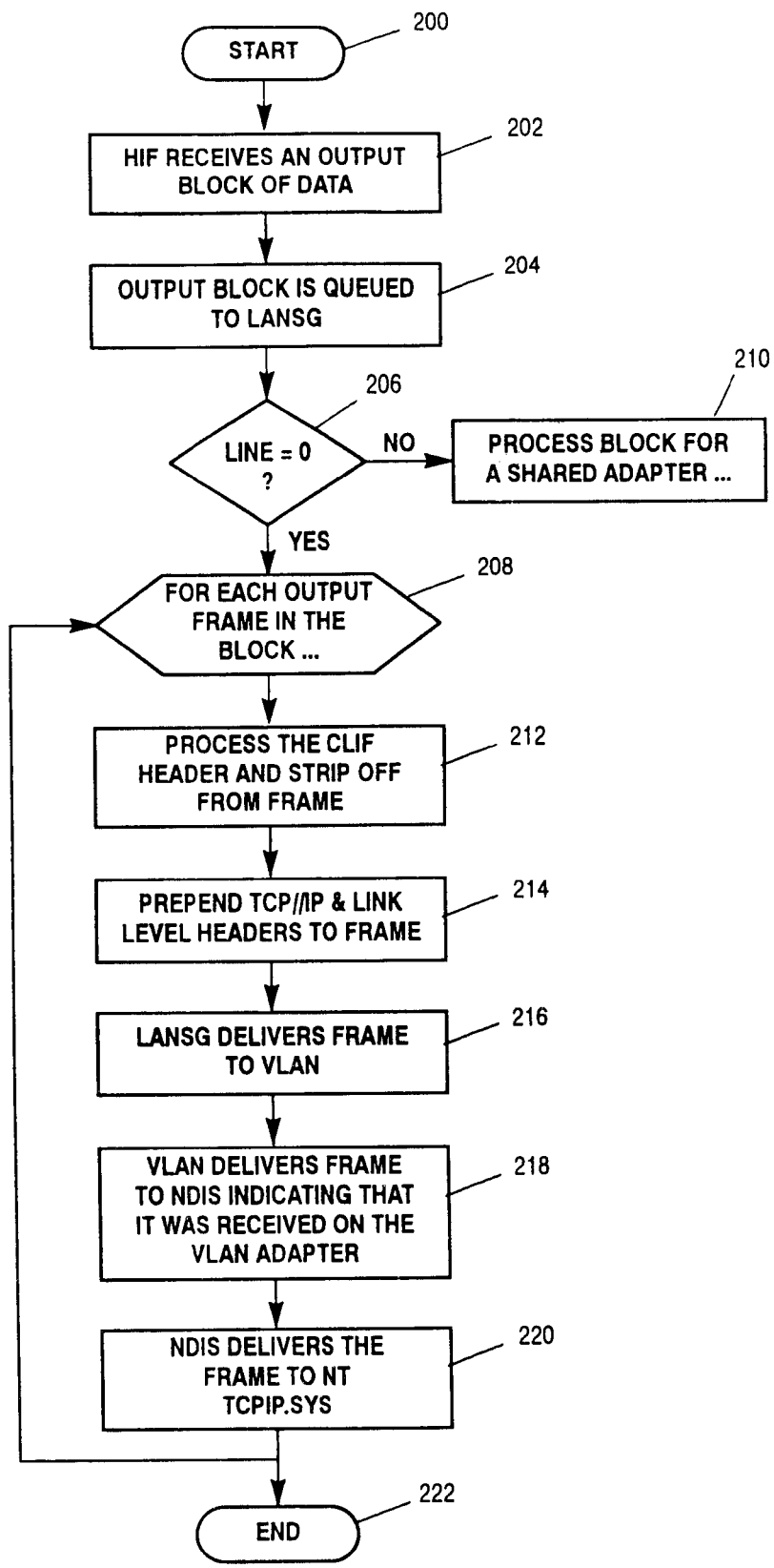
FIG. 10 illustrates the steps performed by the virtual LAN and LAN station group when a block of data containing frames to be output over the simulated FDDI virtual LAN are sent to TCPIP.SYS from the A Series TCP/IP HRNP.

FIGS. 9 and 10 provide further details of how data is transferred between the LANSG 78 and TCPIP.SYS 58 via the VLAN NIC device driver 80.

FIG. 9 illustrates the steps performed by VLAN 80 and LANSG 78 when a frame is sent for output over the VLAN adapter 80 by TCPIP.SYS 58 on the NT server 102. Once the VLAN and LANSG drivers are started at step 180, the outgoing frame is passed by TCPIP.SYS via a call to the NDIS Miniport Interface Library 81 for delivery to VLAN 80 at step 182. At step 184, the NDIS Miniport Interface Library 81 delivers the frame to VLAN 80 via the NDIS/VLAN interface described above. At step 186, VLAN 80 passes the frame to LANSG 78 via the VLAN/LANSG interface described above.

Next, at step 188, a determination is made to determine if a connection is open to the A Series TCP/IP HRNP 44 via the interconnection (HIF). If a connection is not open, the frame is discarded by LANSG 78 at step 190 and the routine ends. However, if a connection is open, control passes to step 192, where the link level headers are stripped from the frame.

At step 194, a CLIF (Connection-Less Interface Function) header is built and prepended to the beginning of the frame. The CLIF header is used between the LANSG 78 and the A Series TCP/IP HRNP 44 to communicate information associated with the frame. Some of the information communicated to the A Series TCP/IP HRNP 44 by LANSG 78 in the CLIF header includes: 1) an indication whether the frame was a broadcast or unicast frame, 2) if unicast, the destination MAC (Media Access Component) address of the frame, 3) the values of the DSAP (Destination Service Access Point) and SSAP (Source Service Access Point) fields from the 802.2 LLC (Logical Link Control) header, and 4) the values of the OUI (Organizationally Unique Identifier) and PID (Protocol IDentifier) fields from the 802.1a SNAP (SubNetwork Attachment Point) header.

Finally, at step 196, the frame is queued to the HIF for delivery to the A Series TCP/IP HRNP 44 as an input frame. The routine ends at step 198.

FIG. 10 illustrates the steps performed by LANSG 78 and VLAN 80 when a block of data containing frames to be output over the simulated FDDI VLAN 80 are sent to TCPIP.SYS 58 via the HIF from the A Series TCP/IP HRNP 44. Once the VLAN and LANSG drivers are started at step 200, a block of data from the A Series TCP/IP HRNP 44 is received on the NT server 102 via the HIF at step 202. At step 204, the block of data is queued to the LANSG module 78. Then, at step 206, the line number that the output block is destined for is checked. If the line number equals 0 (line number 0 is reserved to correspond to VLAN), processing continues at step 208. However, if the line number does not equal 0, then the block is processed at step 210 for a "shared adapter" as described in co-pending application Ser. No. 09/088,421, entitled "Shared Use of A Network Interface Card Between Heterogeneous Computer Systems,".

As indicated at step 208, steps 212 through 220 are applied to each frame in the received block. For a given frame, at step 212, the LANSG module 78 processes information in the CLIF header and strips the CLIF header from the front of the frame. Then at step 214, the LANSG module 78 prepends TCP/IP and link level headers to the frame. Information from the CLIF header is used to determine values used for fields within the link level headers. Next, at step 216, LANSG module 78 delivers the frame to VLAN 80. Then, at step 218, VLAN 80 delivers the frame to the NDIS Miniport Interface Library 81, indicating that it was received on the VLAN adapter 80. Finally, at step 220, the NDIS Miniport Interface Library 81 delivers the frame to TCPIP.SYS 58 as a frame received from the simulated FDDI "virtual LAN", and the routine ends at step 222.

Those skilled in the art will appreciate that the present invention is not limited to use with only one network protocol provider on each system. Rather, the present invention can be used to transfer data to and from multiple network protocol providers on each system. In the preferred embodiment, the only protocol provider making use of the VLAN 80 interface is the TCP/IP HRNP 44.

In accordance with the invention, VLAN 80 is transparent to both TCPIP.SYS 58 and the TCP/IP HRNP 44 on the A Series server 100. TCPIP.SYS interfaces with VLAN 80 as it would normally with a NIC driver through the NDIS Miniport Interface Library 81. The TCP/IP HRNP 44 on the A Series server 100 also interfaces with the VLAN 80 as it would normally with a network interface via LANSG 78. Neither TCPIP.SYS 58 nor the A Series TCP/IP HRNP 44 is aware that they are communicating via VLAN 80.

As the foregoing illustrates, the present invention is directed to methods and apparatus that enable a first network protocol provider, executing on a first computer system, and a second network protocol provider, executing on a second computer system, which is directly interconnected to the first computer system, to communicate at high speed, with low latency, over the interconnection therebetween such that both systems may use their native mechanisms to communicate with each other rather than conventional network communication paths such as Ethernet. In accordance with a preferred embodiment thereof, the present invention comprises an interconnection that couples the input/output (I/O) subsystem of the first computer system to the I/O subsystem of the second computer system and over which data can be transmitted between the systems, and a virtual LAN ("VLAN") device driver executing on the second computer system as an interface between the interconnection and the native communications mechanisms of the second computer system. In a preferred embodiment, the VLAN simulates an NDIS Fiber Distributed Data Interface (FDDI) network interface card (NIC) Miniport driver to the transport protocol driver TCPIP.SYS on the second computer system and exchanges data with the first computer system via a particular line of a LAN station group for delivery to and receipt from the first computer system. It is understood that changes may be made to the embodiments described above without departing from the broad inventive concepts thereof. For example, while the present invention is described above in the context of a system comprising an A Series server and an NT server, it is understood that the methods and apparatus of the present invention can be employed with any two computer systems, whether of the same or different types. Additionally, the interconnection of the present invention is not limited to the particular embodiments disclosed. Rather, the term "interconnection" is intended to encompass other methods and apparatus for transferring data between the I/O subsystems of the first and second computer systems. For example, other embodiments may not require the functionality of the QSP and LANSG components. Rather, a more direct interface between the interconnection device driver (ICD) and the VLAN could be employed. Accordingly, the present invention is not limited to the particular embodiments disclosed, but is intended to cover all modifications that are within the spirit and scope of the invention as defined by the appended claims.

What is claimed is:

1. Apparatus enabling a first network protocol provider, executing on a first computer system, and a second network protocol provider, executing on a second computer system, to communicate in their native protocols, comprising:

an interconnection between an input/output (I/O) subsystem of the first computer system and an I/O subsystem of the second computer system over which data can be transmitted between said first and second systems, wherein said interconnection operates independent of network layer communications; and a virtual local area network (VLAN) executing on the second computer system that exchanges data between the first and second network protocol providers via the interconnection without interfering with the native network protocols of the first and second network protocol providers, the VLAN comprising a device driver executing on the second computer system that simulates a network interface card (NIC) device driver to the network protocol provider on the second computer system.

2. The apparatus recited in claim 1, wherein the first network protocol provider comprises an implementation of the TCP/IP protocol on the first computer system, and wherein the second network protocol provider comprises an implementation of the TCP/IP protocol on the second computer system.

3. The apparatus recited in claim 1, wherein the interconnection between the first computer system and the second computer system comprises:

a physical connection between the I/O subsystem of the first computer system and the I/O subsystem of the second computer system over which data can be transmitted between them; and an interconnection device driver on the second computer system that controls access by the second computer system to the physical connection.

4. The apparatus recited in claim 3, wherein the interconnection between the first and second computer systems further comprises a queue service provider on the second computer system that multiplexes multiple dialogs between said first and second computer systems over the physical connection.

5. The apparatus recited in claim 3, wherein the first computer system comprises a Unisys A Series server and the second computer system comprises an NT server, and wherein the physical connection comprises a connection between a CS-Bus interface of the I/O subsystem of the A Series server and an I/O bus of the I/O subsystem of the NT server.

6. The apparatus recited in claim 5, wherein the I/O bus of the I/O subsystem of the NT server comprises an EISA bus.

7. The apparatus recited in claim 3 wherein the first computer system comprises a Unisys A Series server and the second computer system comprises an NT server, and wherein the physical connection comprises a connection between a port of a Channel Manager Unit (CMU) of the I/O subsystem of the A Series server and an I/O bus of the I/O subsystem of the NT server.

8. The apparatus recited in claim 7, wherein the I/O bus of the I/O subsystem of the NT server comprises a PCI bus.

9. The apparatus recited in claim 3 wherein the first computer system, including a memory space of the first computer system, and its I/O subsystem are emulated within the second computer system, and wherein the physical connection is emulated as a memory-to-memory connection between the memory space of the emulated first computer system and the memory space of the second computer system.

10. The apparatus recited in claim 1, wherein said second computer system is an NT server, said device driver comprises a Network Device Interface Services (NDIS) Miniport driver, and the simulated NIC device driver comprises an NDIS Fiber Distributed Data Interface (FDDI) network interface card (NIC) Miniport driver.

11. The apparatus recited in claim 1, wherein said interconnection includes a LAN station group which assigns said data exchanged between the first and second computer systems via the interconnection to a particular line for transmission via said VLAN.

12. A method of enabling a first network protocol provider, executing on a first computer system, to communicate in its native protocol with a second network protocol provider, executing on a second computer system, in its native protocol, comprising the steps of:

simulating, by a device driver executing on the second computer system, a network interface card (NIC) device driver to the network protocol provider on the second computer system wherein said device driver implements a virtual local area network (VLAN) on the second computer system;

transmitting data over an interconnection between an input/output (I/O) subsystem of the first computer system and an I/O subsystem of the second computer system, independent of network layer communications; and transmitting said data between the first and second computer systems via said VLAN without interfering with said native protocols.

13. The method of claim 12, wherein said second computer system is an NT server, said device driver comprises a Network Device Interface Services (NDIS) Miniport driver, and said simulated NIC device driver comprises an NDIS Fiber Distributed Data Interface (FDDI) network interface card (NIC) Miniport driver.

14. The method of claim 12, wherein said interconnection transmitting step comprises the step of assigning said data transmitted between the first and second computer systems via the interconnection to a particular line of a LAN station group for transmission via said VLAN in said VLAN transmitting step.

* * * * *